(12) United States Patent
Iwata et al.

(10) Patent No.: US 6,956,305 B2
(45) Date of Patent: *Oct. 18, 2005

(54) VOLTAGE FLUCTUATION COMPENSATING APPARATUS

(75) Inventors: Akihiko Iwata, Tokyo (JP); Akihiro Suzuki, Tokyo (JP); Hiroyuki Sasao, Tokyo (JP); Kenichi Koyama, Tokyo (JP); Toshiyuki Kikunaga, Tokyo (JP); Mitsugu Takahasi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 277 days.

This patent is subject to a terminal disclaimer.

(21) Appl. No.: 10/109,044

(22) Filed: Mar. 29, 2002

(65) Prior Publication Data

US 2002/0171294 A1 Nov. 21, 2002

(30) Foreign Application Priority Data

Mar. 30, 2001 (JP) ........................................ 2001-098124

(51) Int. Cl.[7] .............................. H02J 3/12; G05F 1/70
(52) U.S. Cl. ...................................... 307/103; 323/207
(58) Field of Search ................................ 307/103, 105; 323/205, 207

(56) References Cited

U.S. PATENT DOCUMENTS

| 4,673,823 A | * | 6/1987 | Tanaka | 307/11 |
| 4,752,726 A | * | 6/1988 | Aoyama | 323/207 |
| 4,812,669 A | * | 3/1989 | Takeda et al. | 307/105 |
| 5,825,162 A | * | 10/1998 | Kida et al. | 323/210 |

FOREIGN PATENT DOCUMENTS

| CN | 2276680 Y | 3/1998 |
| JP | 3-228924 | 9/1988 |
| JP | 1-170328 | 7/1989 |

* cited by examiner

Primary Examiner—Adolf Berhane
(74) Attorney, Agent, or Firm—Leydig, Voit & Mayer, Ltd.

(57) ABSTRACT

Voltage compensation circuits connect DC voltages accumulated in capacitors having respectively different charging voltages —(which are $2^K$ (where K=0, 1, 2, ...) times the minimum voltage into AC voltages. The voltage compensation circuits are connected in series to an electric power system in series. When the voltage dip occurs in an electric power system, a combination of voltage compensation circuits is selected from the voltage compensation circuits. The sum of the output voltage compensates the voltage dip. During normal operation, a high speed mechanical short circuit switch by-passes the voltage compensation circuits to reduce power loss.

27 Claims, 20 Drawing Sheets

VOLTAGE FLUCTUATION COMPENSATING APPARATUS

BACKGROUND OF THE INVENTION

1. Field of the Invention

The present invention relates to a voltage fluctuation compensating apparatus for detecting and compensating for voltage dip, when a voltage of an electric power system supplied to a load dips instantaneously.

2. Description of the Related Art

In some cases, voltage of an electric power system may dip instantaneously due to lightning so that a precision machine in a factory malfunctions or stops temporarily to cause great damage in a production line. In order to prevent such damage, there is used a voltage fluctuation compensating apparatus for monitoring voltage fluctuation such as an instantaneous voltage dip in an electric power system, and compensating the voltage dip.

FIG. 22 is a schematic configuration diagram showing a related-art voltage fluctuation compensating apparatus. As shown in FIG. 22, electric power from a power line 1 is stepped down by a transformer 2, and then connected to a customer 3 (load) through a voltage fluctuation compensating apparatus. Thus, electric power is supplied to the customer 3. The voltage fluctuation compensating apparatus includes a DC power source 4, an inverter 5, a smoothing filter 6, and a high-capacity transformer 7.

Description will be made below about the voltage compensating operation in such a related-art voltage fluctuation compensating apparatus at the time of an instantaneous dip of a system voltage.

FIG. 23 shows a system voltage, an output of a voltage fluctuation compensating circuit, and a voltage supplied to the customer 3, respectively, at the time of an instantaneous dip of a system voltage. As shown in FIG. 23, when a voltage dip occurs instantaneously in the system voltage, the voltage dip is detected by a detection unit (not shown) which monitors voltage fluctuation. By the power feeding control based on the detected voltage dip, an AC voltage is generated by the DC power source 4 and the inverter 5 in the voltage fluctuation compensating apparatus. The AC voltage is connected in series to the power system through the smoothing filter 6 and the high-capacity transformer 7. Thus, the voltage dip of the power system is compensated. As a result, the output voltage from the voltage fluctuation compensating apparatus is added to the system voltage in which the voltage dip has occurred, so that electric power with a normal voltage is supplied to the customer 3.

Since the related-art voltage fluctuation compensating apparatus is configured thus, the system voltage flows into the inverter 5 through the transformer 7 correspondingly to a load current even when the system voltage is normal. As a result, loss by the transformer 7 and the inverter 5 occurs even at the normal time. Thus, a large-scale cooling unit is required.

In addition, since a voltage is supplied to the power system through the smoothing filter 6 and the transformer 7 at the time of an instantaneous dip of the system voltage, the capacities of the smoothing filter 6 and the transformer 7 becomes high. Thus, there has been a problem that the apparatus increases in size.

SUMMARY OF THE INVENTION

The present invention has been made to solve the above problem. An object of the present invention is to obtain a voltage fluctuation compensating apparatus which enables an accurate voltage compensation at the time of the instantaneous voltage dip of the system voltage, and by which the overall apparatus can be structured at a low cost and in a small size.

According to the invention, there is provided a voltage fluctuation compensating apparatus suppresses fluctuation of a voltage supplied to a load. The voltage fluctuation compensating apparatus includes a detection control section and a plurality of voltage compensation circuits.

The detection control section monitors a voltage dip in an electric power system and controlling power feeding in accordance with a result of the voltage monitoring.

The voltage compensation circuits are connected in series to the electric power system. The voltage compensation circuits include a plurality of energy accumulators respectively having charging voltage values different from one another. The voltage compensation circuits convert DC voltages in the energy accumulators into AC voltages and outputs the AC voltages respectively.

When the voltage dip of the electric power system, a desired combination is selected from the plurality of voltage compensation circuits. Then, the total sum of output voltages from the desired combination compensates the voltage dip of the electric power system.

According to the invention, there is a voltage fluctuation compensating apparatus for suppressing fluctuation of a voltage supplied to a load. The voltage fluctuation compensating apparatus includes a detection control section, a voltage compensation circuit, and a short circuit switch.

The detection control section monitors a voltage dip in an electric power system and controls power feeding in accordance with a result of the voltage monitoring.

The voltage compensation circuit includes an energy accumulator having a charging voltage value. The voltage compensation circuit converts a DC voltage in the energy accumulator into an AC voltage and outputs the AC voltage. The voltage compensation circuit is connected in series to the electric power system.

The short circuit switch connected in parallel with the voltage compensation circuit.

The short circuit switch is closed and the voltage compensation circuit is by-passed when the voltage of the electric power system is normal.

On the other hand, the short circuit switch is opened and the voltage output from the voltage compensation circuit compensates the voltage dip of the electric power system when the voltage of the electric power system dips.

DETAILED DESCRIPTION OF THE PRESENT INVENTION

The present invention will be described in detail with reference to the accompanying drawings.

First Embodiment

A first embodiment of the present invention will be described in detail below.

Figure 1:
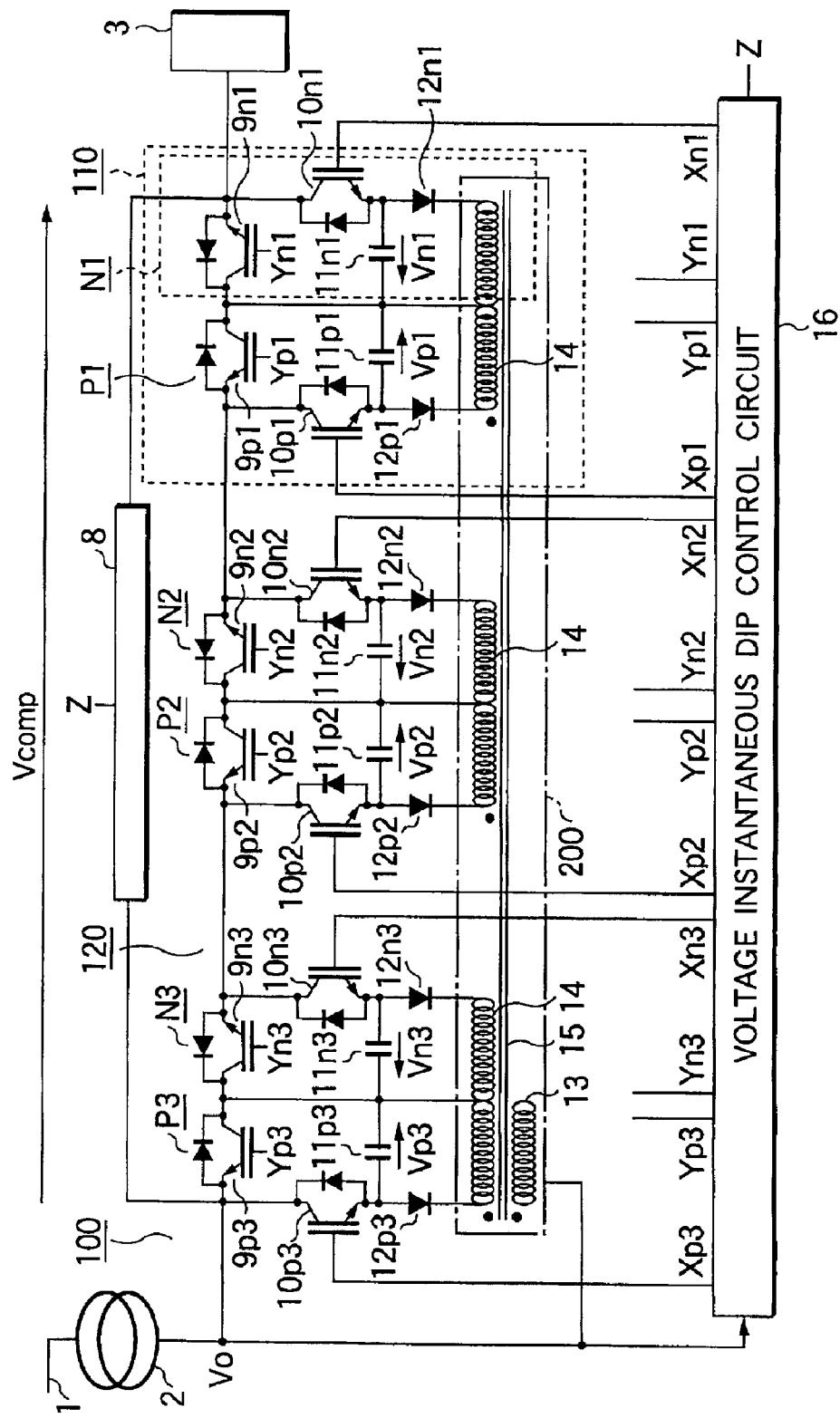
FIG. 1 is a structural view of a voltage fluctuation compensating apparatus according to a first embodiment of the present invention.

FIG. 1 is a structural view of a voltage fluctuation compensating apparatus according to the first embodiment of the present invention. The electric power from the power line 1 is stepped-down by a transformer 2, and connected to the customer 3 (load) through a voltage fluctuation compensating apparatus 100, and the electric power is supplied.

The voltage fluctuation compensating apparatus 100 includes a plurality of compensation units 110 each having two voltage compensation circuits P, N selected according to a polarity of voltage. The compensation units 110 are connected to an electric power system in series. A plurality of serially connected voltage compensation circuits N1, P1, N2, P2, N3, P3, (in this case, 6) constitute a total compensation circuit 120. The total compensation circuit 120 is provided with a high speed mechanical steady-state short-circuit switch 8 in parallel with the total compensation circuits 120 on its output end. Each of the voltage compensation circuits P1–P3, N1–N3 includes an instantaneous dip change-over switch 9, an instantaneous dip compensating switch 10, a charging capacitor 11 as an energy accumulator, a charging diode 12 for charging the charging capacitor 11 and a secondary winding 14 of the charging transformer 200. The charging voltage of the charging capacitor 11 is connected to the electric power system by the instantaneous dip compensating switch 10 which is serially connected to the charging capacitor 11. Further, the instantaneous dip change-over switch 9 and instantaneous dip compensation switch 10 are structured by a semiconductor switching device in which diodes are connected in anti-parallel, for example, such as IGBT. A self-extinguish type element except IGBT may be used as the semiconductor switching device.

In the charging capacitor 11, the voltage is charged by the charging diode 12 and secondary winding 14 of the charging transformer 200, and the charging transformer primary winding 13 is connected to the electric power system. Numeral 15 is a core of the charging transformer 200.

Two voltage compensation circuits P, N in one compensation unit 110 manage the positive and negative voltage generation, respectively. That is, by the operation of the two charging diodes 12$p$, 12$n$, the voltage of respectively anti-polarity is charged into the charging capacitor 11$p$ and charging capacitor 11$n$ by the same amplitude by using the common secondary winding 14. The ratio of the voltage charged in the charging capacitor 11((11$p$1, 11$n$1), (11$p$2, 11$n$2), (11$p$3, 11$n$3)) in each compensation unit 110, is set to almost the ratio of an exponent of 2. That is, the following relationship is satisfied.

$$Vn3 = 2 \times Vn2 = 2 \times 2 \times Vn1$$

(in the same manner as also p)

The steady-state short-circuit switch 8, instantaneous dip change-over switch 9, and instantaneous dip compensating switch 10 are connected to the voltage instantaneous dip control circuit 16 as the detection control section. Further, the system voltage is also inputted into the voltage instantaneous dip control circuit 16. The structure and operation of this voltage instantaneous dip control circuit 16 will be described below.

Figure 2:
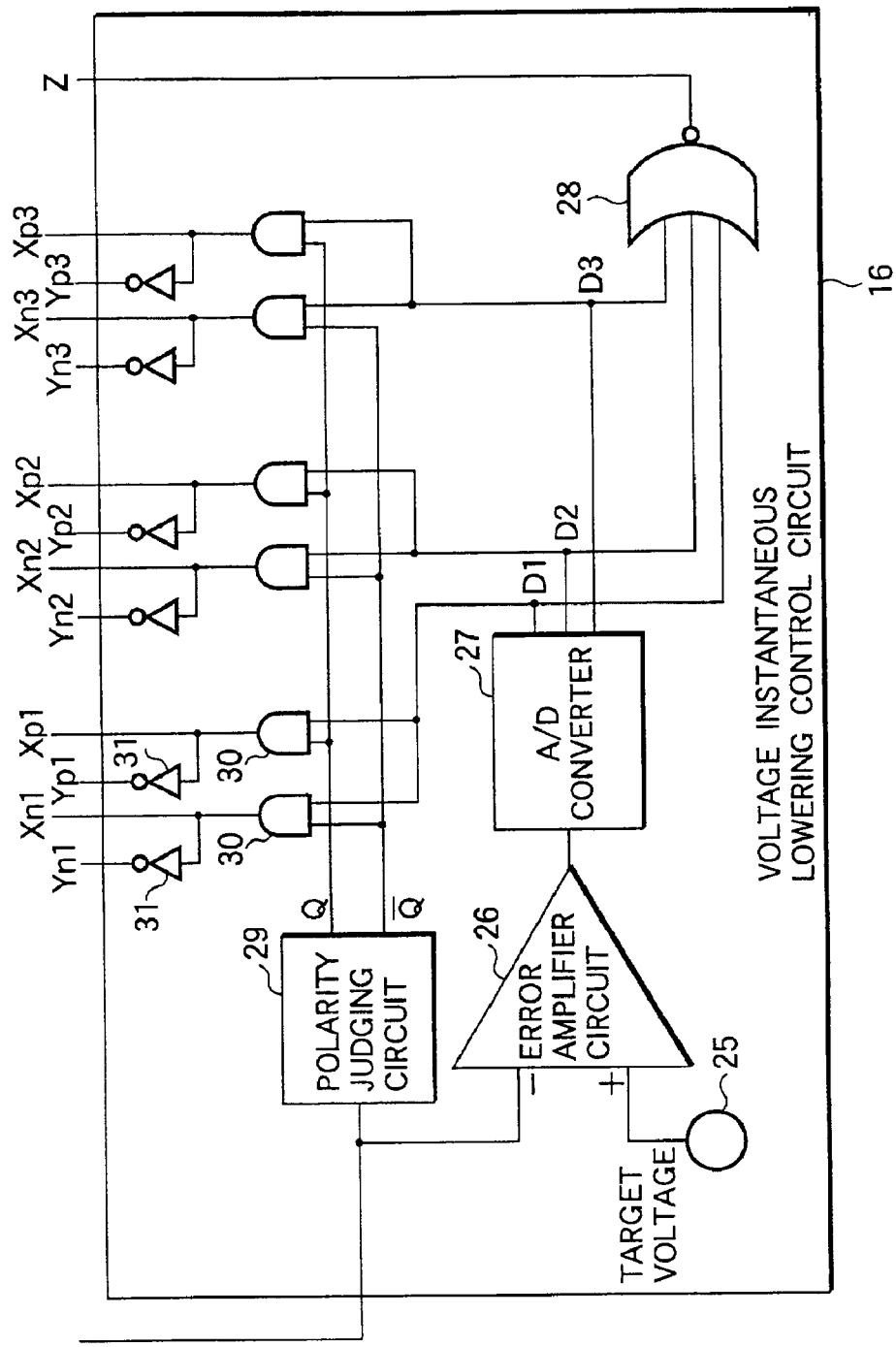
FIG. 2 is a circuit diagram showing the details of a voltage instantaneous dip control circuit according to the first embodiment of the present invention.
Figure 3:
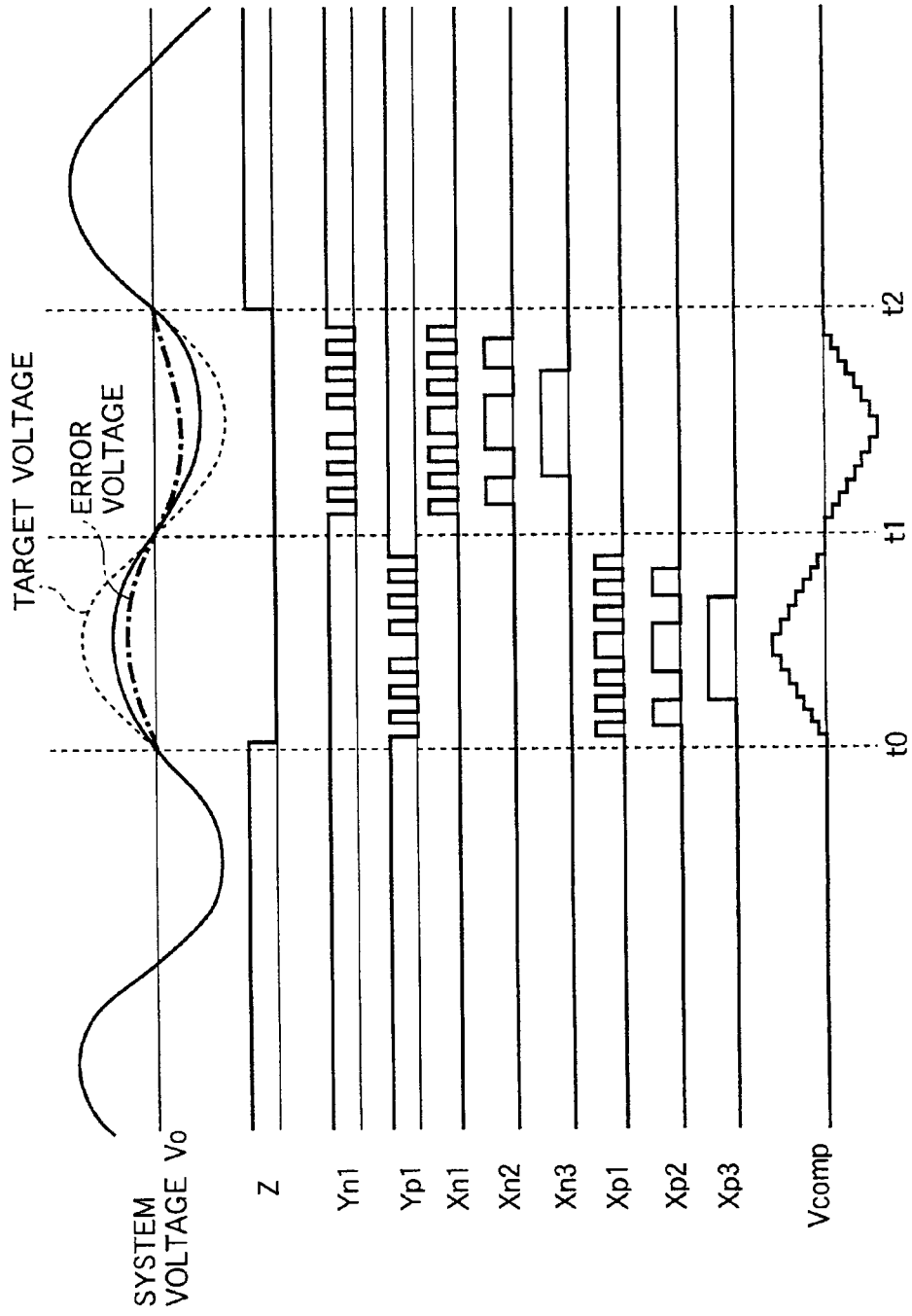
FIG. 3 is a waveform view explaining the operation of the voltage fluctuation compensating apparatus according to the first embodiment of the present invention.

FIG. 2 is a circuit diagram showing the detail of the voltage instantaneous dip control circuit 16. Further, FIG. 3 is a waveform view showing the relationship between the operation of the voltage compensation by the voltage fluctuation compensating apparatus 100 and the control operation of the voltage instantaneous dip control circuit 16.

As shown in FIG. 2, the system voltage is inputted into the voltage instantaneous dip control circuit 16, and compared to the target voltage 25. At this time, the target voltage 25 is the system voltage at the ordinary time. The difference between both is amplified by an error amplifier 26. After the absolute conversion is conducted, it is converted into 3 bit digital signal (D1–D3) by the A/D converter 27. A gain of the error amplifier 26 is adjusted in advance so that, when the difference between the system voltage and target voltage 25 is equal to the charging voltage Vp1 of the charging capacitor 11$p$1, only the lowest bit in the output signal from the A/D converter 27 is 1, that is, "001".

When any one of the signals D1–D3 is 1, the steady-state short-circuit switch 8 is turned off by the signal Z (=0) through a NOR circuit 28. On the one hand, the system voltage inputted into the voltage instantaneous dip control circuit 16 is also inputted into a polarity judgement circuit 29, and the polarity is judged. Next, corresponding to a case where the polarity of the system voltage is positive or negative, the signal Yp or Yn, Xp or Xn which are active in the digital signals D1–D3, are selected through an AND circuit 30, and inverter 31. The Xp or Xn is a drive signal of the instantaneous compensation switch 10, and the Yp or Yn is a drive signal of the instantaneous dip change-over switch 9, and it is structured by the inverter 31 so that the instantaneous dip change-over switch 9 and the instantaneous compensation switch 10 are always operated at the anti-polarity. When the system voltage is normal, that is, the digital signals D1–D3 are all 0, the steady-state short-circuit switch 8 is turned on (signal Z is 1), instantaneous dip change-over switch 9 is on (signal Y is 1), and instantaneous dip compensating switch 10 is in the off condition (signal X is 0), and the current flows in the steady-state short-circuit switch 8. At this time, the charging capacitor 11 is charged at a predetermined voltage by the charging transformer 200. Because the charging transformer 200 may conduct only a function to charge the charging capacitor 11, the capacity may be small.

Next, referring to FIG. 3, the compensation operation at the time of instantaneous dip will be described. It is presumed that the voltage dip is instantaneously generated in the system voltage at the time t0. The error voltage is generated in the output of the error amplifier circuit 26 after the time t0. According to that, the digital signals D1–D3 are generated corresponding to the error voltage in the output of the A/D converter 27. Simultaneously with that, the signal Z is 0, and the steady-state short-circuit switch 8 is turned off. Because the polarity of the system voltage is positive at time t0–t1, the digital signals D1–D3 are respectively transmitted to the p side element. When the signal D1 of the lowest bit is 1, in the voltage compensation circuit P1, the Xp1 is 1, Yp1 is 0, and the instantaneous dip compensating switch 10$p$1 is turned on. Then, the instantaneous dip change-over switch 9$p$1 is turned off, and the voltage Vp1 of the charging capacitor 11$p$1 is outputted from the instantaneous dip compensating switch 10$p$1. When the signal D2 is 1, in the voltage compensation circuit P2, Xp2 is 1, Yp2 is o, and the instantaneous dip compensating switch 10$p$2 is turned on. Then, the instantaneous dip change-over switch 9$p$2 is turned off, and the voltage Vp2 of the charging capacitor 11$p$2 is outputted from the instantaneous dip compensating switch 10$p$2. In the same manner, when the signal D3 of the highest bit is 1, in the voltage compensation circuit P3, the voltage Vp3 of the charging capacitor 11$p$3 is outputted. Relating to the signal which is 0 in each digital signal D1–D3, for example, when the signal D1 of the lowest bit is 0, in the voltage compensation circuit P1, because the Xp1 is 0, Yp1 is 1, the output end is short circuited by the instantaneous dip change-over switch 9$p$1, and the output from the voltage compensation circuit P1 is almost zero. These outputs are combined in the system, and 8 gradation voltage output of "000"–"111" can be generated, and the maximum compensation voltage is 7×Vp1. Up to the time t1–t2, because the polarity of system voltage is negative, the digital signals D1–D3 are respectively transmitted to n side element, and in the voltage compensation circuit N1–N3, the compensation voltage is outputted in the same manner, and the maximum compensation voltage is 7×Vn1.

In the above first embodiment, because the total compensation circuit 120 structured by the plurality of voltage compensation circuits N1, P1, N2, P2, N3, P3, which are serially connected, are directly connected in series to the electric power system, the large transformer as a conventional one, is unnecessary. Further, in parallel with the total compensation circuit 120, a high speed mechanical steady-state short-circuit switch 8 is provided, and when the system voltage is normal, because the steady-state short-circuit switch 8$b$ is electrically communicated, and the current is by-passed, the apparatus loss at the normal operation time is almost zero, the cooling apparatus may be a small sized one, and the whole apparatus is low cost, and the size can be reduced.

Further, when the system voltage is instantaneously lowered, because the combination of a plurality of voltage compensation circuit N1, P1, N2, P2, N3, P3 having the charging capacitor 11 in which respectively different voltage is charged, is selected by the digital gradation control, and the voltage compensation is conducted by the total sum of the output voltage, the fine voltage compensation can be conducted, and the output filter may be unnecessary or a small sized one. Further, as compared to a case where the response lag corresponding to the band of the output filter is generated in the case of generally used PWM control, because the control system is a digital gradation control, the voltage can be compensated at real time, and the voltage compensation can be further accurately conducted.

Further, because the voltage charged in charging capacitor 11 of each voltage compensation circuit P1–P3, N1–N3 is Vn3=2×Vn2=2×2×Vn1 (in the same manner also as p), the compensation voltage can be high accuracy gradation controlled at the same interval. Further, because the charging capacitor 11 can be slowly charged when the system voltage is normal, through the charging transformer 200 connected to the electric power system, it is enough even when the capacity of the charging transformer 200 is small, and the size of the charging circuit is small, and the cost is low. Further, because the charging is automatically conducted, the apparatus is simplified.

Figure 4:
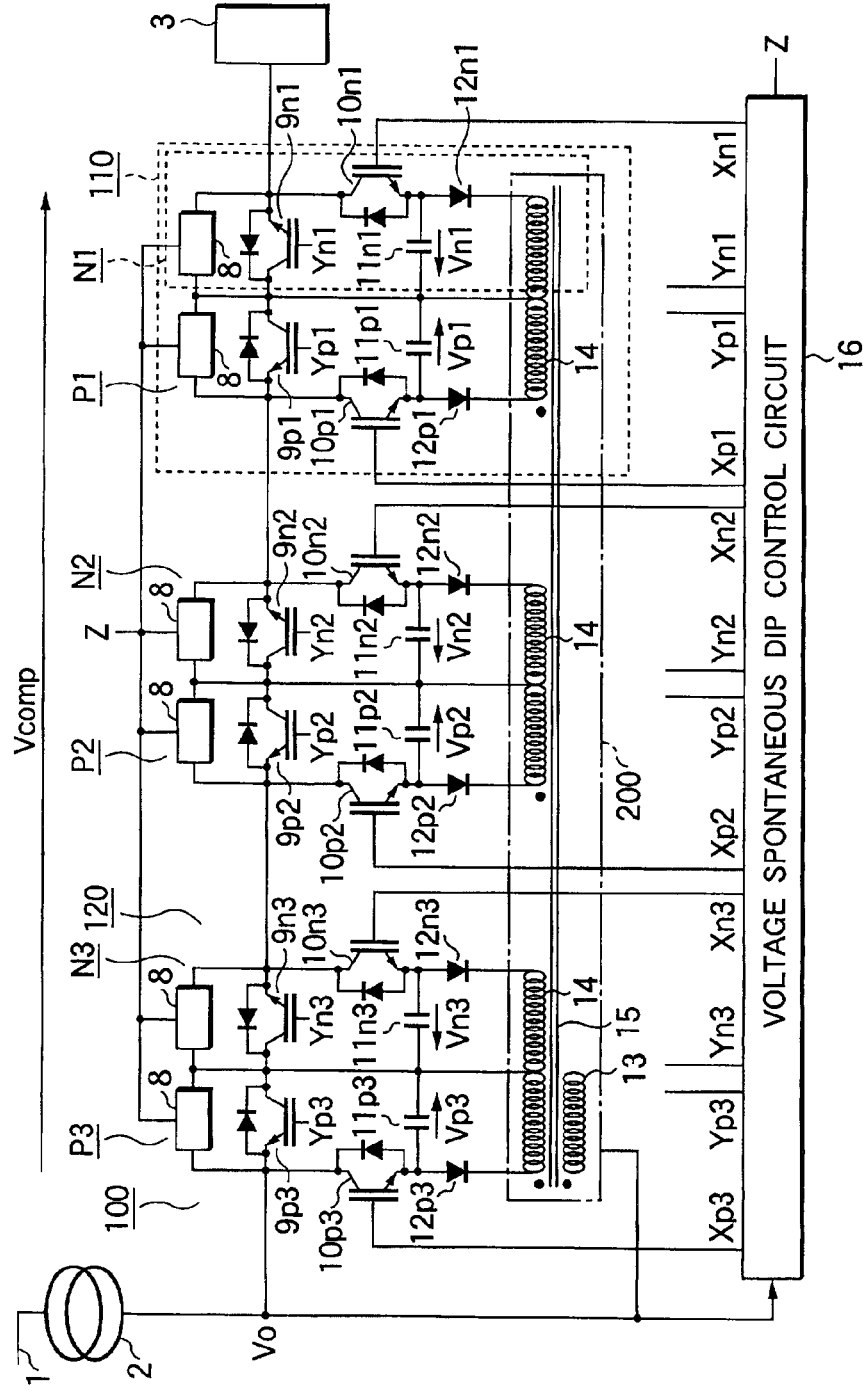
FIG. 4 is a structural view of the voltage fluctuation compensating apparatus according to another example of the first embodiment of the present invention.
Figure 5:
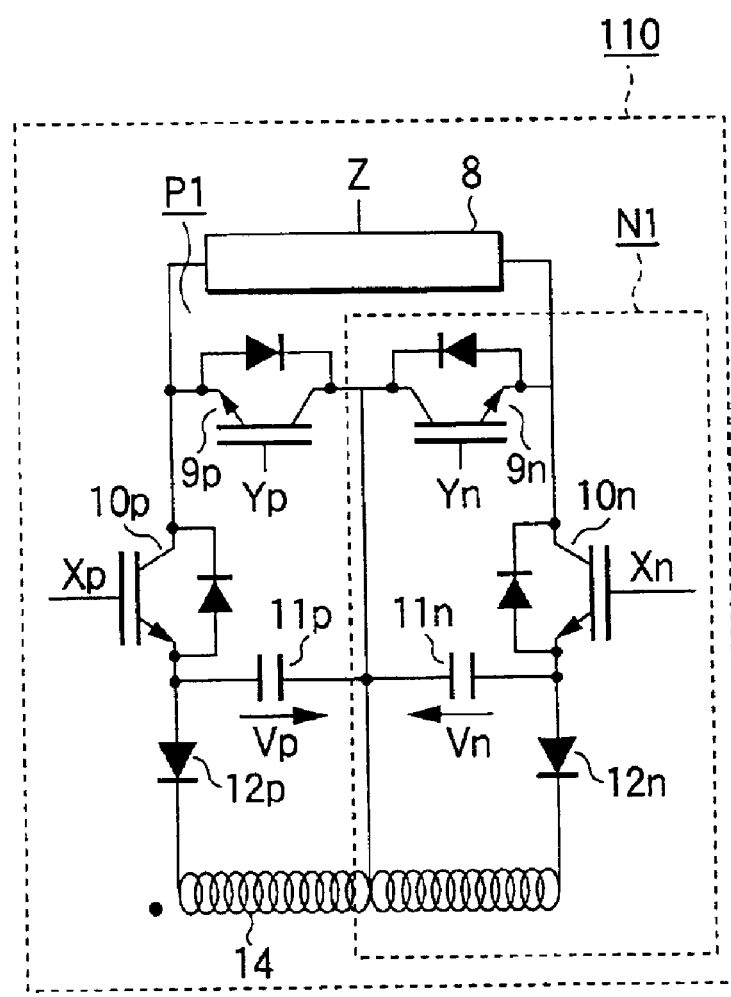
FIG. 5 is a structural view of a voltage compensation circuit according to another example of the first embodiment of the present invention.

In this connection, in the above first embodiment, one steady-state short-circuit switch 8 is provided in parallel with the total compensation circuit 120 at the output ends of the total compensation circuit 120, however, as shown in FIG. 4, it may be provided in parallel at each output end of each voltage compensation circuit P1–P3, N1–N3. Further, the steady-state short-circuit switch 8 may be provided at every output end of each compensation unit 110 composed of one pair of voltage compensation circuit P, N, and the structural view of each compensation unit 110 in this case, is shown in FIG. 5. Alternatively, the steady-state short-circuit switch 8 may be provided at every output end of the other plurality of voltage compensation circuits P1–P3, N1–N3. Even when a plurality of steady-state short-circuit switches 8 are provided in this manner, the control system is the same as a case of one switch, and at the ordinary time, all the steady-state short-circuit switches 8 are closed, and all the voltage compensation circuits P1–P3, N1–N3 are by-passed, and at the time of the voltage dip of the electric power system, all the steady-state short-circuit switches 8 are opened, and the voltage dip of the electric power system is compensated by the voltage output from the voltage compensation circuits P1–P3, N1–N3.

Second Embodiment

Figure 6A:
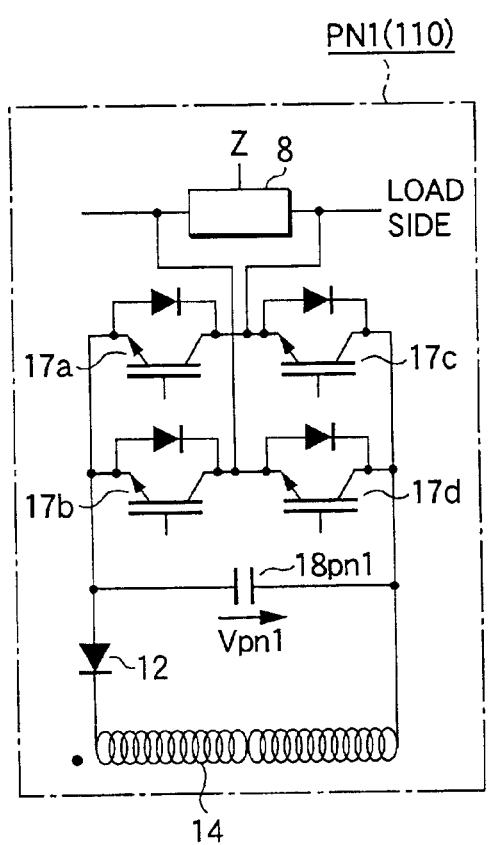
FIGS. 6A and 6B are structural views of the voltage compensation circuit according to a second embodiment of the present invention.
Figure 6B:
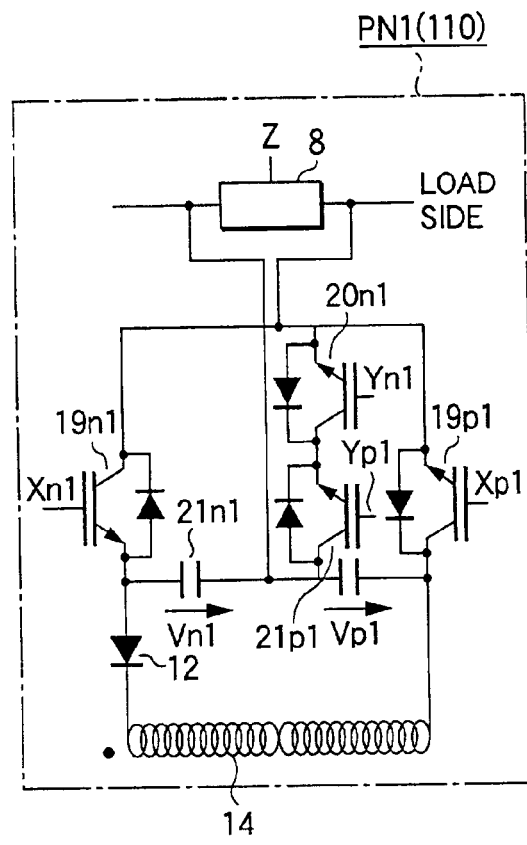

Next, a second embodiment of the present invention will be described. FIG. 6A and FIG. 6B are structural views of the voltage compensation circuit in the voltage fluctuation compensating apparatus according to the second embodiment of the present invention. In the above first embodiment, the compensation unit 110 is structured by a pair of voltage compensation circuit P, N, however, in 2 kinds of examples shown in this second embodiment, each compensation unit 110 to output the positive and negative voltage is structured by one voltage compensation circuit PN. The voltage compensation circuit PN1 corresponding to the voltage compensation circuit P1 and the voltage compensation circuit N1 in the first embodiment will be described below.

In the first example shown in FIG. 6A, the voltage compensation circuit PN1 is provided with: a full bridge inverter composed of 4 semiconductor switching devices 17a–17d in which diodes are connected in anti-parallel; charging capacitor 18 as the energy accumulator; charging diode 12 for charging the charging capacitor 18; and secondary winding 14 of the charging transformer 200, and the charging voltage Vpn1 of the charging capacitor 18 is connected to the electric power system with either one of the positive or negative polarity by the on/off control of the semiconductor switching devices 17a–17d. Further, at the output end of the voltage compensation circuit PN1, the steady-state short-circuit switch 8 is provided in parallel with the voltage compensation circuit PN1. Also in this case, in the same manner as in the above first embodiment, the voltage compensation circuit PN1 provided with the charging capacitor 18 whose charging voltage is respectively different, and voltage compensation circuits PN2, PN3 (not shown) are connected to the electric power system in series. Further, the ratio of the voltage charged in the charging capacitor 18 in each voltage compensation circuit PN1, PN2, PN3, is set to the ratio of an exponent of 2. That is, the following relationship is satisfied. $Vpn3 = 2 \times Vpn2 = 2 \times 2 \times Vpn1$.

Next, the operation will be described. At the normal time, that is, when the digital signals D1–D3 are all 0, the steady-state short-circuit switch 8 is in the condition of on, and the current flows in the steady-state short-circuit switch 8. At this time, either one of the upper arm side 17a, 17b, and the lower arm side 17c, 17d, in the semiconductor switching devices 17a–17d, is turned on, and the other one is in the condition of off.

Further, at the voltage dip of the electric power system, in each voltage compensation circuits PN1, PN2, PN3 selected by digital signals D1–D3 generated corresponding to the error voltage, in the case where the polarity of the system voltage is positive, when the switching elements 17b, 17c are turned on, and switching elements 17a and 17d are turned off, the charging voltage is outputted with positive polarity through the switching elements 17b, 17c. Further, in the case where the polarity of the system voltage is negative, when the switching elements 17a, 17d are turned on, and switching elements 17b and 17c are turned off, the charging voltage is outputted with negative polarity through the switching elements 17a, 17d. In this connection, relating to the signal of 0 in each digital signal D1–D3, for example, when the signal D1 of the lowest bit is 0, in the voltage compensation circuit PN1, because either one of the upper arm side 17a, 17b, or lower arm side 17c, 17d is turned on, and the other one is turned off, the output end is short circuited, and the output from the voltage compensation circuit PN1 is almost zero. Thereby, the voltage compensation can be conducted in the same manner as in the above first embodiment. In thus structured voltage compensation circuits PN1, PN2, PN3, because, by respectively one charging diode 12 and charging capacitor 18, the compensation voltage which can correspond to both polarities of positive and negative, can be outputted, the size can be reduced and the low cost can be attained.

Next, the second example shown in FIG. 6B will be described. As shown in the drawing, the voltage compensation circuit PN1 is provided with: a half bridge inverter composed of 2 semiconductor switching devices 19p1, 19n1 in which diodes are connected in anti-parallel; instantaneous dip change-over switch in which 2 semiconductor switching devices 20p1, 20n2, are connected in series in the reverse direction, and which is connected in parallel with the output end of the voltage compensation circuit PN1; charging capacitors 21p1, 21n1, as the energy accumulator; charging diode 12 to charge the charging capacitors 21p1, 21n1; and secondary winding 14 of the charging transformer 200. Further, at the output end of the voltage compensation circuit PN1, the steady-state short-circuit switch 8 is provided with in parallel with the voltage compensation circuit PN1. In this case also, in the same manner as in the above first embodiment, the voltage compensation circuit PN1 provided with the charging capacitor 21 whose charging voltage is respectively different, and the voltage compensation circuit PN2, PN3 (not shown) are connected to the electric power system in series.

In this case, it is controlled by the control signals X, Y, Z which are the same as the signals generated in the voltage instantaneous dip circuit 16, for example, in the voltage compensation circuit PN1 shown in the drawing, the signal Xp1 is transmitted to the switching element 19p1, and the signal Xn1 is to the switching element 19n1, the signal Yp1 is to the switching element 20p1, the signal Yn1 is to the switching element 20n1, and the signal Z is to the steady-state short-circuit switch 8, respectively transmitted. Thereby, at the time of voltage dip of the electric power system, for example, when the polarity is positive and the signal D1 of the lowest bit is 1, in the voltage compensation circuit PN1, Xp1 is 1, Yp1 is 0, and the voltage Vp1 of the charging capacitor 21p1 is outputted by the switching element 19p1. When the polarity is negative and the signal D1 of the lowest bit is 1, in the voltage compensation circuit PN1, Xn1 is 1, Yn1 is 0, and the voltage Vn1 of the charging capacitor 21n1 is outputted by the switching element 19n1. Also when the signal D1 is 0, in the same manner as in the above first embodiment, because the switching elements 20p1, 20n1, constituting the instantaneous dip change-over switch, are turned on, the output end is short circuited, and the output from the voltage compensation circuit PN1 is almost zero. Thereby, the voltage compensation operation which is the same as shown in FIG. 3 of the above first embodiment can be conducted.

In thus structured voltage compensation circuits PN1, PN2, PN3, and the charging capacitors 21p, 21n of the positive polarity, and the negative polarity can be charged by the common charging path, and the charging diode 12 may be one, and a tap of the charging transformer secondary winding 14 is enough for being reduced by one, and the size can be reduced and the cost reduction can be attained.

Third Embodiment

Figure 7:
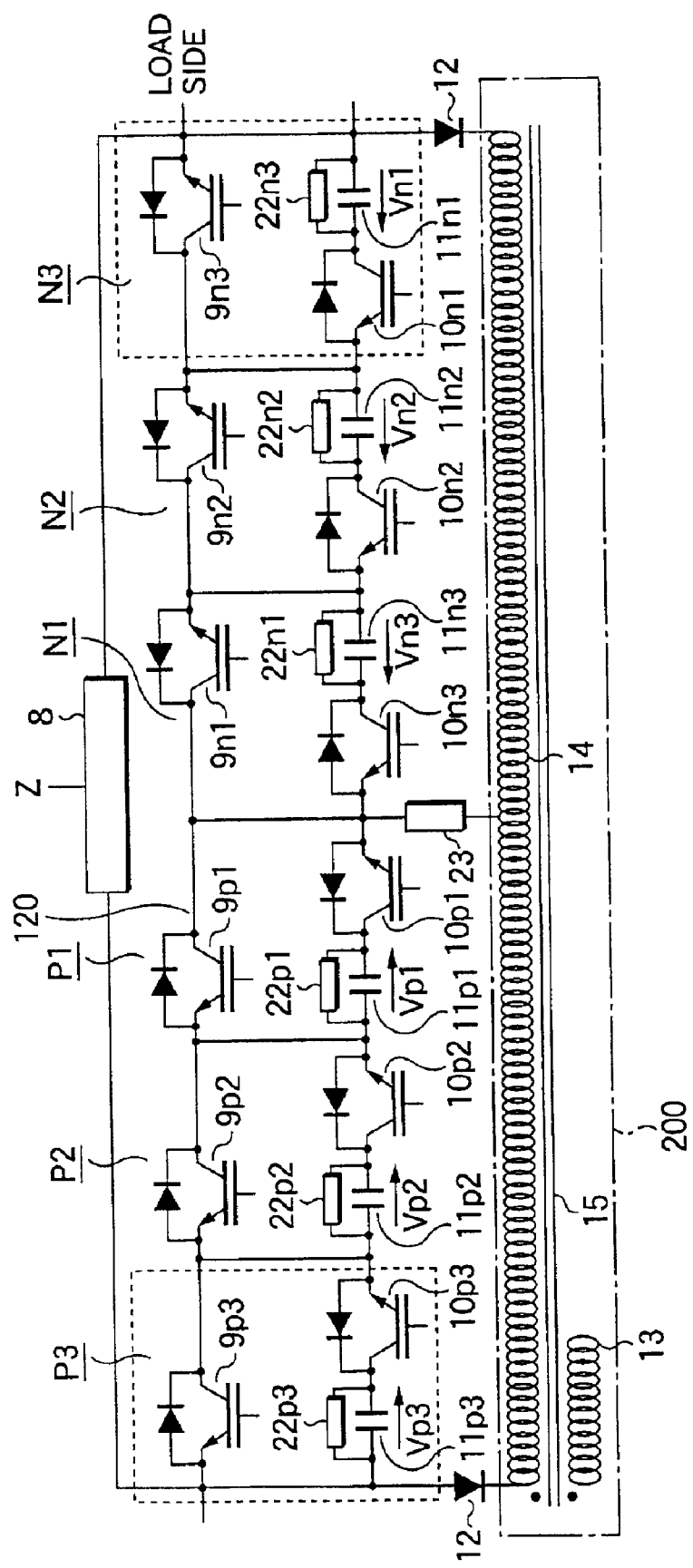
FIG. 7 is a structural view of the voltage fluctuation compensating apparatus according to a third embodiment of the present invention.

Next, the third embodiment of the present invention will be described. FIG. 7 is a structural view of the voltage fluctuation compensating apparatus according to the third embodiment of the present invention. In the above first embodiment, the compensation unit 110 is structured by one pair of voltage compensation circuits P, N, however, in this third embodiment, the voltage compensation circuit P in which the positive polarity voltage is generated, and the voltage compensation circuit N in which the negative polarity voltage is generated, are respectively arranged, and for example, as shown in the drawing, the voltage compensation circuit P3, voltage compensation circuit P2, voltage compensation circuit P1, voltage compensation circuit N1, voltage compensation circuit N2, and voltage compensation circuit N3 are connected in series in the above-described order, and the total compensation circuit 120 is structured, and at their output ends, the high speed mechanical short circuit switch 8 is provided in parallel with the total compensation circuit 120. Each voltage compensation circuit P1–P3, N1–N3, is provided with, in the same manner as in the above first embodiment, the instantaneous dip change-over switch 9 provided in parallel at the output end, instantaneous dip compensating switch 10, and charging capacitor 11 as the energy accumulator.

Each charging capacitor 11 is connected with the voltage setting resistance 22 respectively corresponding to desired charging voltage in parallel, and is provided with the charging transformer secondary winding 14 by which all the charging capacitors 11 are collectively charged. An intermediate tap of the charging transformer secondary winding 14 is connected to the connection point of the voltage compensation circuit P1 and the voltage compensation circuit N1, and the charging diodes 12 are respectively provided on the positive side and negative side, and in the positive side charging path and negative side charging path, the charging voltage whose voltage is divided corresponding to the ratio of parallely connected voltage setting resistance 22 is charged into each charging capacitor 11. Each resistance 22 is almost selected as follows (n is in the same as p).

(The resistance of 22p3) = 2×(the resistance of 22p2)

= 2×2×(the resistance of 22p1)

By conducting in this manner, the voltage of each charging capacitor 11 can be set in the same manner as in the above first embodiment. Further, the current limiting resistance 23 which is sufficiently small as compared to the voltage setting resistance 22 connected in parallel with each charging capacitor 11, is inserted between the intermediate tap of the charging transformer secondary winding 14 and the connection point of the voltage compensation circuits P1, N1.

In this connection, in this structure, except for the charging path of the charging capacitor 11, the current flowing through the current limiting resistance 23 and instantaneous dip change-over switch 9, can not be interrupted. Accordingly, in this structure, initially, when the system voltage is normal and the steady-state short-circuit switch 8 is in the conducting condition, the system is controlled so that all of instantaneous dip change-over switches 9 are turned off. In this connection, the control except that is the same as in the above first embodiment. That is, the instantaneous dip change-over switch 9 is controlled so that it is forcibly turned off before t0, and after t2. Thereby, the charging path is separated from the system, and the leakage of the charging voltage into the system is prevented. However, because any one of the instantaneous dip change-over switches 9 is turned on during time t0–t2 in FIG. 3 at which the steady-state short-circuit switch 8 is turned off, the charging voltage leaks through the instantaneous dip change-over switch 9. Because the leakage current flowing in the charging transformer 200 through the instantaneous dip change-over switch 9 and charging diode 12 from the intermediate tap at this time, is limited by the current limiting resistance 23, the breakage of the charging transformer 200 can be prevented. As described above, the current limiting resistance 23 suppresses the leakage current at the instantaneous dip compensation time (t0–t2), and when the following relationship is satisfied between the voltage setting resistance 22 and the current limiting resistance 23, when the charging capacitor 11 is charged, the voltage dip at the current limiting resistance 23 can be suppressed to such a degree that it is no problem.

(Resistance of voltage setting resistance 22p1)>>(Resistance of current limiting resistance 23)

In this embodiment, because all the charging capacitors 11 are charged by the common secondary winding 14 of the charging transformer 200, a structure in which only one tap is used from the intermediate point of the secondary winding 14, may be allowable, and can be very simple one, and the down-sizing of the voltage fluctuation compensating apparatus 100 and the cost reduction can be attained.

In this connection, in the above embodiments 1–3, the voltage compensation circuits P1–P3, N1–N3, or the voltage compensation circuits PN1–PN3 are connected in series, that is, 3 compensation units 110 are used, however, it is not limited to this, and the larger the number of compensation units 110 are, the finer voltage compensation can be conducted.

Fourth Embodiment

Figure 8:
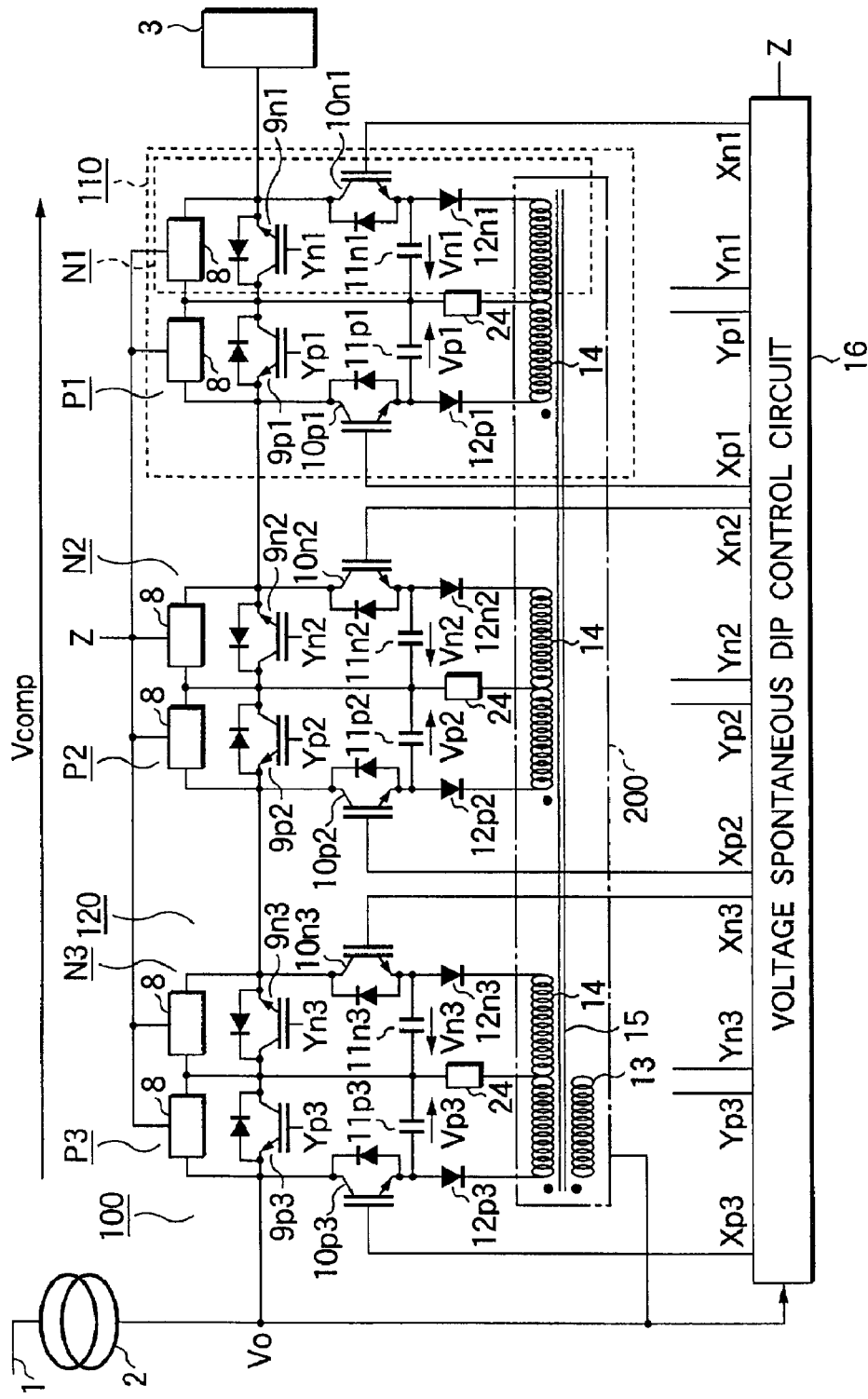
FIG. 8 is a structural view of the voltage fluctuation compensating apparatus according to a fourth embodiment of the present invention.

Next, referring to FIG. 8, a fourth embodiment of the present invention will be described. In the voltage fluctuation compensating apparatus 100 shown in the above embodiments 1 and 2, a charging loop is structured by the charging transformer 14, charging capacitor 11, and charging diode 12, and after the voltage compensation operation completion, in the charging loop, the charging current flows in the direction of the charging transformer secondary winding 14→charging capacitor 11→charging diode 12. Herein, when the voltage compensation operation period is long, and the voltage dip of the charging capacitor 11 is large, this charging current becomes large, and there is a possibility that the burning of the secondary winding 14 or breakage of the charging diode 12 is generated. Therefore, in this fourth embodiment, the current limiting resistance 24 is provided in the charging loop. Thereby, it can be prevented that the over current flows in the charging loop at the time of charging, and the abnormal heat-generating or breakage of the circuit parts constituting the charging loop can be prevented.

Fifth Embodiment

Figure 9:
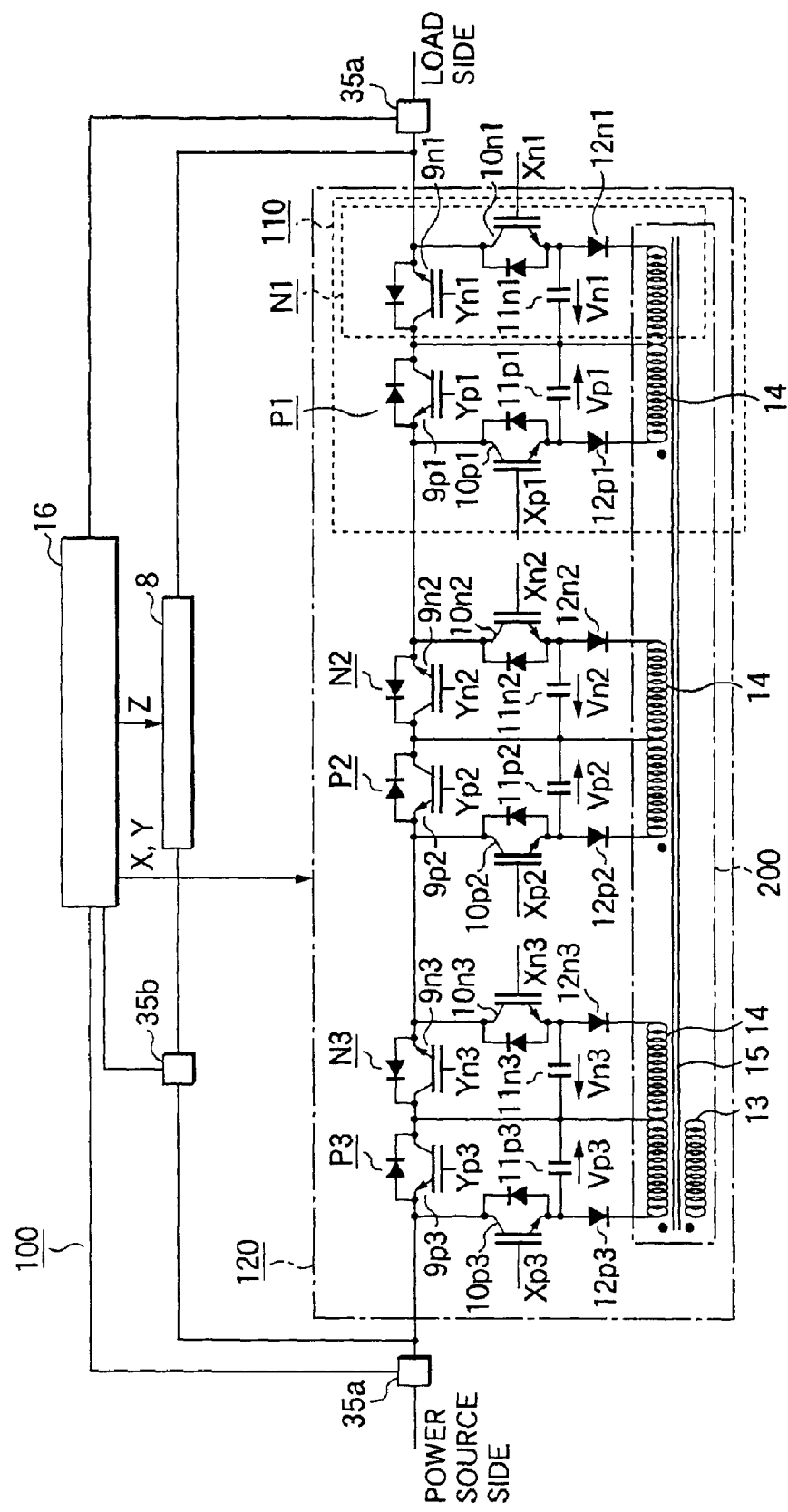
FIG. 9 is a structural view of the voltage fluctuation compensating apparatus according to a fifth embodiment of the present invention.

Next, in the voltage fluctuation compensating apparatus 100 having the same structure shown in FIG. 1 of the above first embodiment, referring to FIG. 9, the steady-state short-circuit switch 8 provided in parallel at the output end of the total compensation circuit 120, will be detailed. As shown in the drawing, a measuring section 35a to measure the current or voltage is arranged on the power source side or load side of the electric power system connected to the parallel circuit structured by the total compensation circuit 120 and the steady-state short-circuit switch 8. Further, a measuring section 35b is arranged also in the current path circulating in the steady-state short-circuit switch 8. According to the electric information from these measuring sections 35 (35a, 35b), a voltage instantaneous dip control circuit 16 controls each voltage compensation circuits P1–P3, N1–N3, or steady-state short-circuit switch 8 at an appropriate time as described above.

Next, the operation of the voltage fluctuation compensating apparatus 100 will be described, centering on the operation of the steady-state short-circuit switch 8. This voltage fluctuation compensating apparatus 100 compensates the voltage when the voltage of the electric power system is lowered, and onto the load (customer 3), sends the normal voltage, and initially, when the system voltage is normal, the steady-state short-circuit switch 8 is in the on condition, and the current flows in this steady-state short-circuit switch 8. Thereby, the electric power loss in the voltage fluctuation compensating apparatus 100 is very small.

Figure 10:
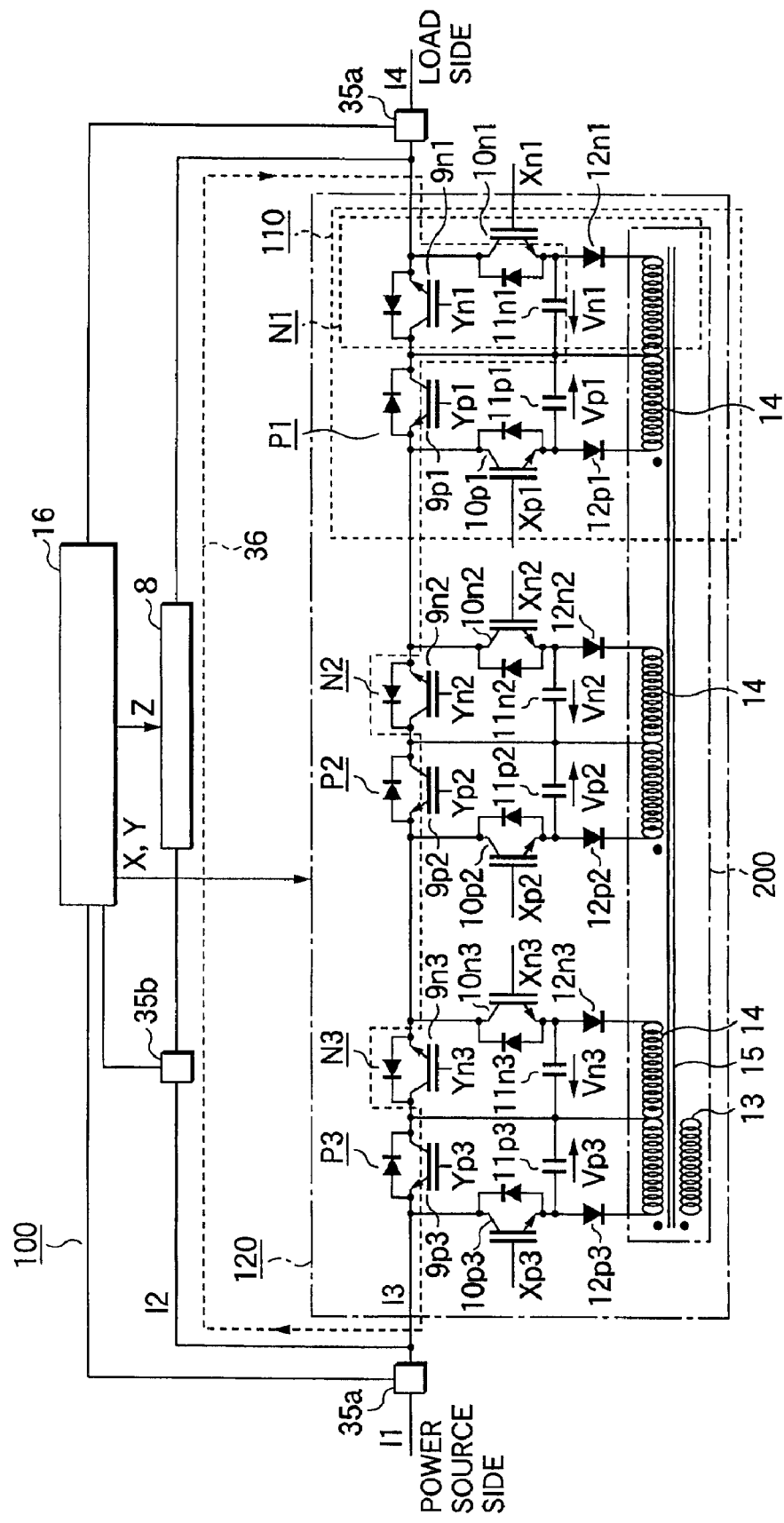
FIG. 10 is a view explaining a commutation operation of a steady-state short-circuit switch according to the fifth embodiment of the present invention.

Next, a case where the abnormality such as the instantaneous dip is generated in the system voltage, will be described. The object of this apparatus is to conduct the voltage compensation onto the dip of the voltage, however, before that, the current flowing in the steady-state short-circuit switch 8 is commutated to the total compensation circuit 120. That is, it is necessary that the current flowing in the steady-state short-circuit switch 8 is quickly interrupted. FIG. 10 is a view explaining such the commutation operation, and further, in FIG. 11, the change of the current voltage waveform due to the compensation operation of the voltage fluctuation compensating apparatus 100 including the voltage dip of the electric power system and the commutation operation after that is typically shown.

Figure 11:
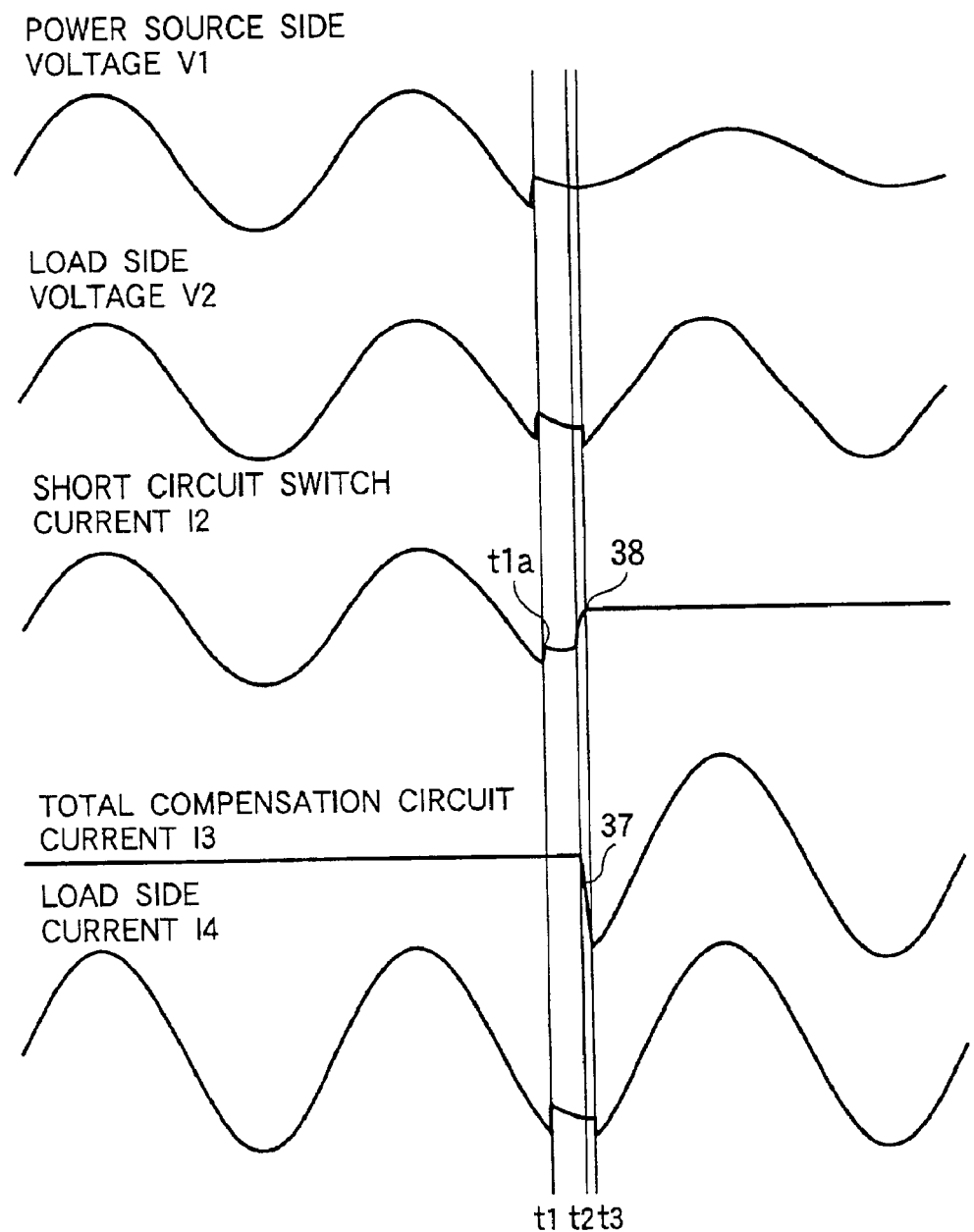
FIG. 11 is a view showing a current voltage waveform at the time of the voltage compensation operation of the voltage fluctuation compensating apparatus according to the fifth embodiment of the present invention.

In the measuring section 35a on the power source side, the voltage and the current are always monitored, and as shown in FIG. 11, at the time t1, the voltage abnormality is generated and it is detected. Just after that, the voltage instantaneous dip control circuit 16 sends out the start-switching command to the steady-state short-circuit switch 8. At the time t1, the voltage on the power source side (system voltage) V1 is lowered, and following that, the steady-state short-circuit switch current I2 is also lowered. The contact point of the steady-state short-circuit switch 8 is opened at the time $t1_a$ by the start-switching command and the arc is generated, however, normally, when the condition is as it is, the current flows in the steady-state short-circuit switch 8 to the natural zero point of the current, and the voltage compensation operation can not be conducted to that time. Therefore, between the contact points of the steady-state short-circuit switch 8, the arc is generated, and after that, at the time t2 at which it becomes the distance between contact points at which commutation is possible, as shown in FIG. 10, for example, the compensation switch 10n1 of the voltage compensation circuit N1 of the total compensation circuit 120 is turned on, and the instantaneous dip change-over switch 9 of the other voltage compensation circuits N2, N3, P1–P3, is turned on. Thereby, the electric charge previously charged in the charging capacitor 11n1 is circulated in an instantaneous interrupting closed loop 36 as the closed circuit through the steady-state short-circuit switch 8, in the anti-polarity to the current flowing in the steady-state short-circuit switch 8. In this connection, the time t2 at which it becomes the distance between contact points at which commutation is possible, means the time at which the contact point is separated up to the distance at which it can withstand the voltage applied between the contact points at the time of the commutation completion.

The frequency of the discharging current from the charging capacitor 11n1 flowing in the instantaneous interrupting closed loop 36 is determined by the electrostatic capacity of the charging capacitor 11n1 and an inductance of this closed loop 36, and for example, is sufficiently higher than the commercial frequency such as 50 Hz or 60 Hz. Therefore, the high frequency current (discharging current) 37 of the instantaneous interrupting closed loop 36 is superimposed on the commercial frequency current flowing in the steady-state short-circuit switch 8, and at the time t3, the current zero point 38 is forcibly formed in the steady-state short-circuit switch current I2. At this forcible current zero point 38, the steady-state short-circuit switch 8 interrupts the current, and after that, the current of the system flows in the total compensation circuit 120. As shown in FIG. 11, at the time t2–t3, the steady-state short-circuit switch current I2 is reduced, and reversely, the total compensation circuit current I3 is increased. The rate in which this is increased is determined the frequency determined by the electrostatic capacity of the charging capacitor 11n1 and the inductance of the instantaneous interrupting closed loop 36. Just after the current is commutated in the total compensation circuit 120, by the control from the voltage instantaneous dip control circuit 16, the total compensation circuit 120 conducts the compensation operation in the same manner as the above first embodiment.

Figure 12:
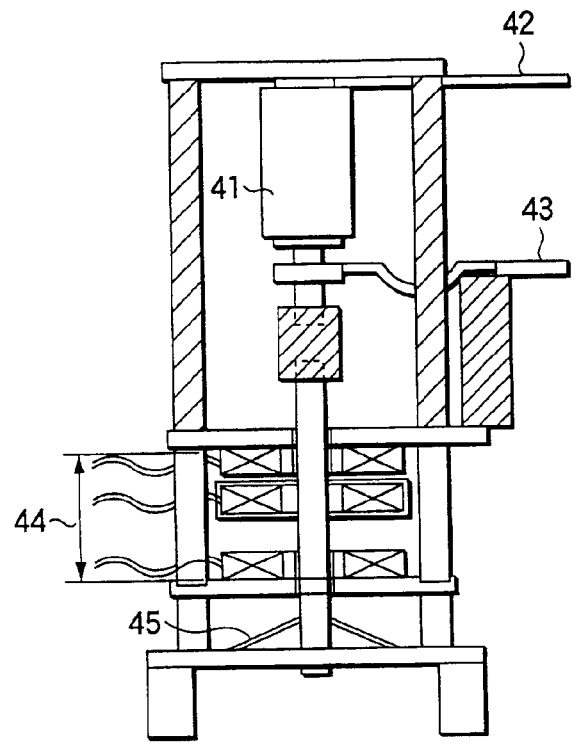
FIG. 12 is a sectional view showing the structure of a steady-state short-circuit switch according to the fifth embodiment of the present invention.

In this connection, it is necessary that the steady-state short-circuit switch 8 quickly opens the contact to compensate the voltage as instantaneously as possible. FIG. 12 is a sectional view when the high speed mechanical steady-state short-circuit switch 8 is structured by the vacuum opening and closing apparatus using the electromagnetic repulsive force. In the drawing, numeral 41 is a vacuum valve which is a contact point section to open and close the electric path, numeral 42 is a fixed side terminal connected to the vacuum valve 41, and numeral 43 is a movable side terminal, and the current of the system flows in the electric path structured by the fixed side terminal 42—vacuum valve 41—movable side terminal 43. Although not shown, there are the fixed contact and movable contact in the vacuum valve 41. Numeral 44 is an electromagnetic repulsive section which is a drive section to open and close the contact point of the vacuum valve 41, and numeral 45 is a spring mechanical section to conduct the maintenance of the contact force to contact the contact point and the open-contact condition of the contact point. In the steady-state short-circuit switch 8 structured as described above, the contact points in the vacuum valve 41 can be separated at about 1 ms from the time when the open-contact command is given, and is an appropriate structure for the instantaneous interruption. Further, because of the mechanical contact, the loss during the time of the current flowing is very small.

In the fifth embodiment, at the time of the start of opening of the steady-state short-circuit switch 8, the discharging current 37 is circulated from the charging capacitor 11 of the total compensation circuit 120, and the current zero point 38 is forcibly generated in the steady-state short-circuit switch current, and the steady-state short-circuit switch current can be instantaneously interrupted. Therefore, the compensation operation of the voltage dip can be started instantaneously from the time when the abnormality is generated in the voltage. Further, the apparatus to generate the forcible current zero point or the control apparatus is not necessary separately, and in the structure appropriate for the downsizing, and cost reduction, the high reliable voltage fluctuation compensating apparatus can be obtained.

In this connection, in the above embodiment, although the discharging current 37 is circulated from the charging capacitor 11n1 in the total compensation circuit 120, when the polarity of the discharging current 37 is the same, the discharging current 37 can also be circulated by the other charging capacitors 11n2, 11n3, or the combination of them.

Further, the commutation operation of the steady-state short-circuit switch 8 shown in the above embodiment can also be applied in the same manner for the above third embodiment, in which the steady-state short-circuit switch 8 is connected in parallel with the total compensation circuit 120, and further, not only the voltage fluctuation compensating apparatus 100 in which a plurality of voltage compensation circuits P1–P3, N1–N3, are connected in series, but a case where, by one voltage compensation circuit, the voltage fluctuation compensating apparatus is structured, and connected to the electric power system in series, can also be applied in the same manner. Further, in the above embodiment, when the steady-state short-circuit switch 8 starts to be opened, the discharging current 37 is circulated from the charging capacitor 11n1 in the total compensation circuit 120, and the current flowing in the steady-state short-circuit switch 8 is interrupted, however, when the current flowing in the steady-state short-circuit switch 8 can be instantaneously interrupted by supplying the current in the reverse direction to the current, another commutation means may also be used.

Sixth Embodiment

Figure 13:
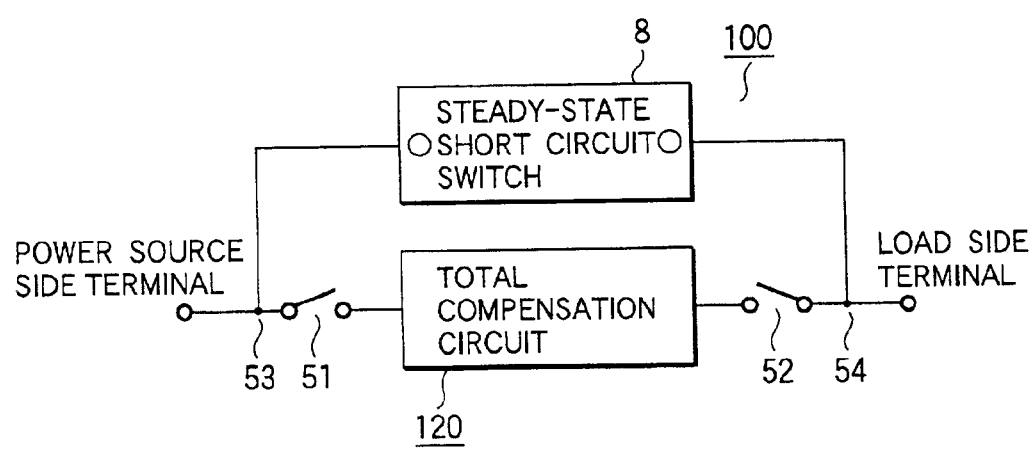
FIG. 13 is an outline structural view of the voltage fluctuation compensating apparatus according to a sixth embodiment of the present invention.

Next, a sixth embodiment of the present invention will be described. FIG. 13 is an outline structural view of the voltage fluctuation compensating apparatus according to the sixth embodiment of the present invention. As shown in the drawing, in the voltage fluctuation compensating apparatus 100 provided with the high speed mechanical steady-state short-circuit switch 8 in parallel with the total compensation circuit 120 at the output end of the total compensation circuit 120 in which a plurality of voltage compensation circuits P, N are all connected in series, at both ends of the total compensation circuit 120, the cut off switches 51, and 52 are respectively connected to the total compensation circuit 120 in series. These cut off switches 51 and 52 are arranged on the total compensation circuit 120 side from the connection points 53 and 54 of the total compensation circuit 120 and steady-state short-circuit switch 8.

Next, the operation will be described. The total compensation circuit 120 are circuits by which the insufficient voltage is compensated at the time of abnormality in which the system voltage is lowered, however, when the voltage is normal, the steady-state short-circuit switch 8 is in the condition of on, and in the circuit impedance from the connection point 53 to the connection point 54, because the circuit in the steady-state short-circuit switch 8 side is lower than that in the circuit structured by the cut off switches 51, 52 and the total compensation circuit 120, almost all of the current flows in the steady-state short-circuit switch 8, and the loss at the normal time of the voltage fluctuation compensating apparatus 100 is largely suppressed. At this time, the cut off switches 51 and 52 are in the condition of on. From this condition, when the abnormality such as the dip of the system voltage is generated, the steady-state short-circuit switch 8 is turned off, and the total compensation circuit 120 conducts the operation to compensate the insufficient amount of the voltage as described in the above first embodiment. In this connection, when the necessity of the inspection or repair is generated in the total compensation circuit 120, at the normal time, because the current flows in the steady-state short-circuit switch 8, the cut off switches 51 and 52 are turned off, and the inspection or repair of the total compensation circuit 120 is conducted. Further, at the time of dip of the system voltage, in the case where the total compensation circuit 120 conducts the voltage compensation operation, when the inspection or repair of the total compensation circuit 120 is conducted, the steady-state short-circuit switch 8 is turned on and the cut off switches 51 and 52 are turned off.

In the above embodiment, the cut off switches 51 and 52 are respectively provided at both ends of the total compensation circuit 120, and at the time of the inspection or repair of the total compensation circuit 120, the steady-state short-circuit switch 8 is turned on, and the cut off switches 51 and 52 are turned off. Therefore, while the electric power is supplied from the primary side terminal (power source side) onto the secondary side terminal (load side), there is no case where the power failure is generated on the load side, and although, at the time of dip of the voltage, the compensation can not be conducted, the power supply can be continuously conducted. Further, at this time, when the cut off switches 51 and 52 are turned off, the total compensation circuit 120 is in the condition of no-voltage, and there is no possibility of the electric shock, and the inspection or repair is possible.

Figure 14A:
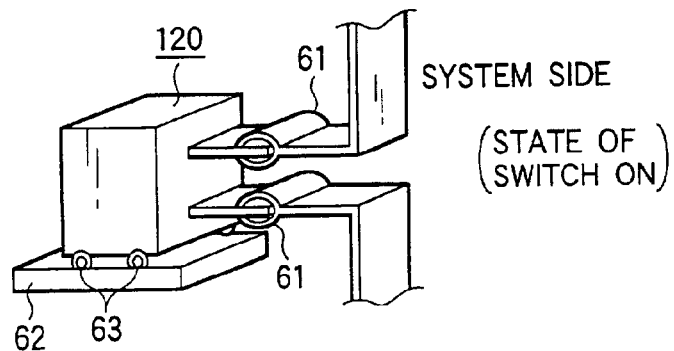
FIGS. 14A and 14B are views showing the structure of a cut off switch according to the sixth embodiment of the present invention.
Figure 14B:
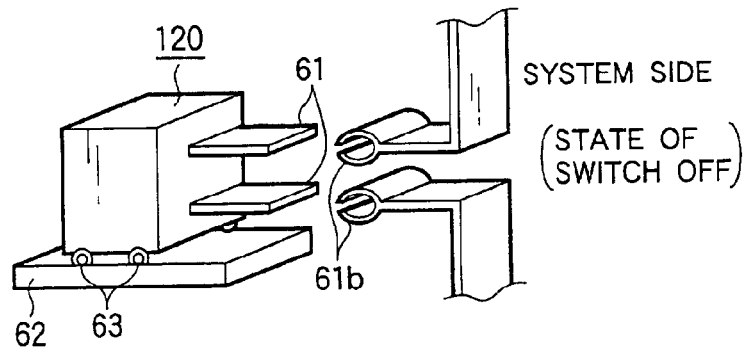

In this connection, in the cut off switches 51, 52 used in the present embodiment, for example, as shown in FIGS. 14 A and B, a joint 61 composed of a joint convex terminal 61a and a joint concave terminal 61b, is used, and when the total compensation circuit 120 in which a wheel 63 is provided on a plate 62, and placed movably, is removed from the electric power system and the operation by which the distance necessary for the insulation is separated, is conducted, it may also be electrically separated from the system by the joint 61.

Seventh Embodiment

Figure 15:
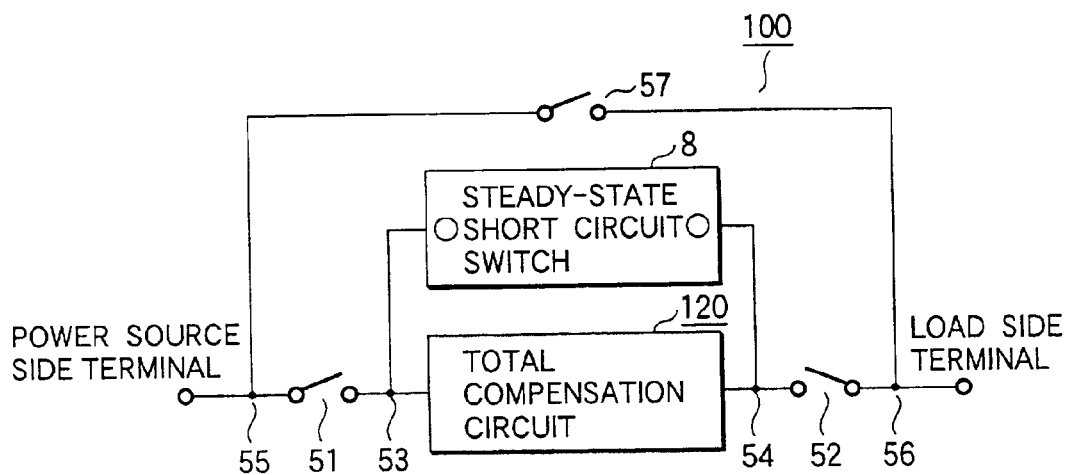
FIG. 15 is an outline structural view of the voltage fluctuation compensating apparatus according to a seventh embodiment of the present invention.

Next, a seventh embodiment of the present invention will be described. FIG. 15 is an outline structural view of the voltage fluctuation compensating apparatus according to the seventh embodiment of the present invention. As shown in the drawing, the cut off switches 51 and 52 are respectively connected to both ends of the total compensation circuit 120 in series with the total compensation circuit 120, in the voltage fluctuation compensating apparatus 100 provided with the high speed mechanical steady-state short-circuit switch 8, in parallel with the total compensation circuit 120 at the output end of the total compensation circuit 120 to which all of a plurality of voltage compensation circuits P, N are serially connected. These cut off switches 51, 52 are arranged outside (opposite side to the total compensation circuit 120) from the connection points 53, 54, and the by-pass switch 57 are connected to the further outside connection points 55, 56 in parallel with the circuit with which the total compensation circuit 120 and steady-state short-circuit switch 8 are connected in parallel.

Next, the operation will be described. The total compensation circuit 120 is circuits by which the insufficient voltage is compensated at the time of abnormality in which the system voltage is lowered, however, when the voltage is normal, the steady-state short-circuit switch 8 is in the condition of on, and in the circuit impedance from the connection point 53 to the connection point 54, because the circuit on the steady-state short-circuit switch 8 side is lower than that in the circuit structured by the total compensation circuit 120, almost all of the current flows in the steady-state short-circuit switch 8, and the loss at the normal time of the voltage fluctuation compensating apparatus 100 is largely suppressed. At this time, the cut off switches 51 and 52 are in the condition of on, and the by-pass switch 57 is in the condition of off. From this condition, when the abnormality such as the dip of the system voltage is generated, the steady-state short-circuit switch 8 is turned off, and the total compensation circuit 120 conducts the operation to compensate the insufficient amount of the voltage as described in the above first embodiment. In this connection, when the necessity of the inspection or repair is generated in the total compensation circuit 120 or steady-state short-circuit switch 8, the by-pass switch 57 is turned on, and cut off switches 51, 52 are turned off.

In such the voltage fluctuation compensating apparatus 100, even at the time of the inspection and repair of the total compensation circuit 120 and steady-state short-circuit switch 8, while the electric power is supplied from the primary side terminal (power source side) onto the secondary side terminal (loadside), there is no case where the power failure is generated on the load side, and although, at the time of dip of the voltage, the compensation can not be conducted, the power supply can be continuously conducted. Further, at this time, when the cutoff switches 51 and 52 are turned off, the total compensation circuit 120 and the steady-state short-circuit switch 8 are in the condition of no-voltage, and there is no possibility of the electric shock, and the inspection or repair is possible.

Figure 16A:
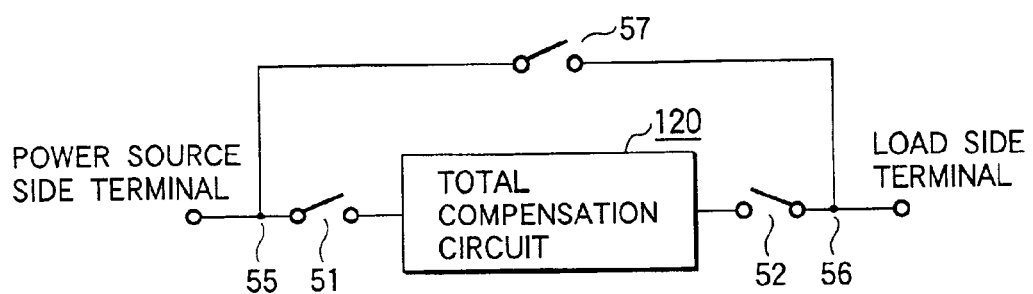
FIGS. 16A and 16B are outline structural views of the voltage fluctuation compensating apparatus according to another example of the seventh embodiment of the present invention.
Figure 16B:
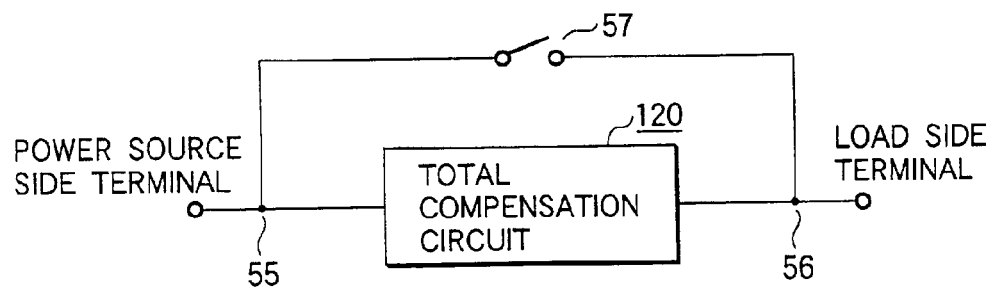
Figure 17:
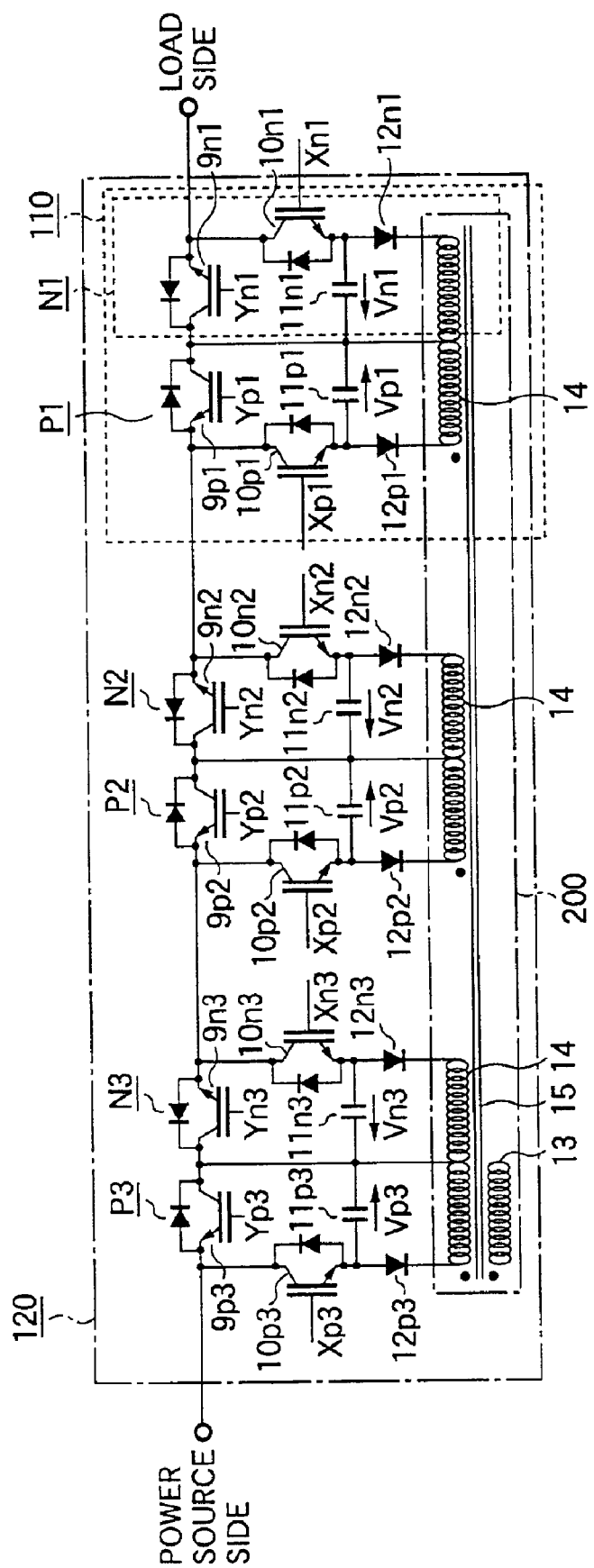
FIG. 17 is a structural view of total compensation circuit according to another example of the seventh embodiment of the present invention.

In this connection, as shown in FIG. 16A and FIG. 16B, when the steady-state short-circuit switch 8 is not provided, at the normal time, the by-pass switch 57 is in the condition of off, and the current flows in the circuit of the switching element of the instantaneous dip change-over switch 9 of the total compensation circuit 120 shown in FIG. 17, and the diodes connected in parallel with that, and at the time of system voltage dip, the same compensation operation as in the above embodiment is conducted in the total compensation circuit 120. In this case also, in the same manner as in the above seventh embodiment, when the necessity of the inspection or repair is generated in the total compensation circuit 120, the by-pass switch 57 is turned on, and the inspection or repair is conducted. In this case, in FIG. 16A, when the cut off switches 51, 52 are turned off, because the total compensation circuit 120 is in the condition of no-voltage, there is no possibility of electrical shock, and the inspection or repair is possible.

Eighth Embodiment

Figure 18:
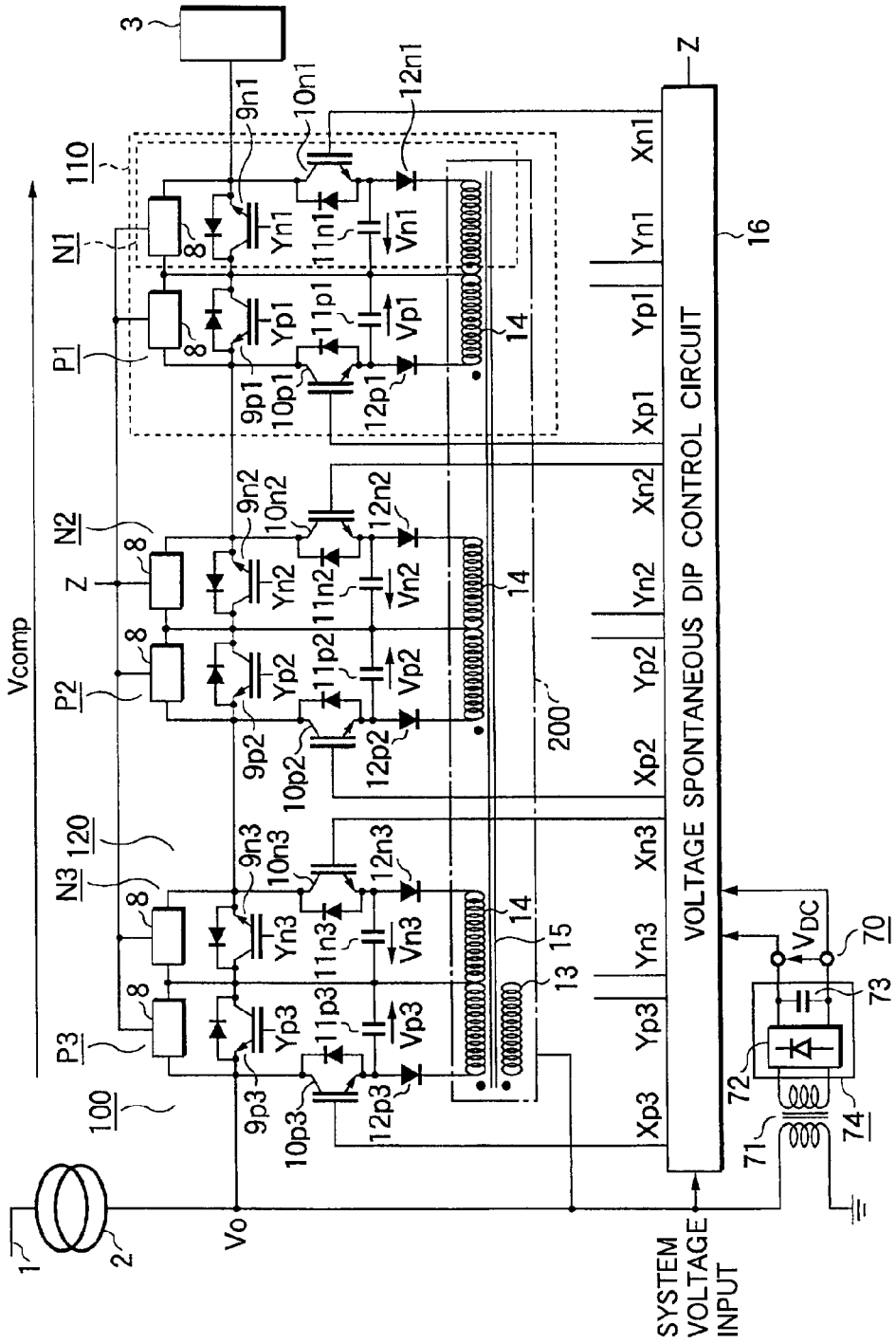
FIG. 18 is a structural view of the voltage variation compensation apparatus according to an eighth embodiment of the present invention.

Next, an eighth embodiment of the present invention will be described. FIG. 18 is a structural view of the voltage fluctuation compensating apparatus according to the eighth embodiment of the present invention. As shown in the drawing, in the above first embodiment, in the voltage fluctuation compensating apparatus 100 shown in FIG. 4 in this case, a DC power source apparatus 70 for the control circuit to operate the voltage instantaneous dip control circuit 16 is provided. This DC power source apparatus 70 is structured by a step down transformer 71 whose primary side is connected to the electric power system, and a converter circuit 74 which is connected to the secondary side of the step down transformer 71 and is composed of the rectifier circuit 72 and capacitor 73.

Next, the operation of the DC power source apparatus 70 will be described. The DC power source apparatus 70 for the control circuit takes in the power source from the power line 1 which is an object to conduct the voltage compensation, and by the step down transformer 71 connected to the power line 1, it is converted into the voltage used for the voltage instantaneous dip control circuit 16. The converter circuit 74 is connected to the secondary side of the step down transformer 71, and converts the AC to the DC. The output voltage is stabilized by the capacitor 73 provided in an output portion of the converter circuit 74, and the DC voltage for the control circuit $V_{DC}$ is supplied to the voltage instantaneous dip control circuit 16.

Figure 19:
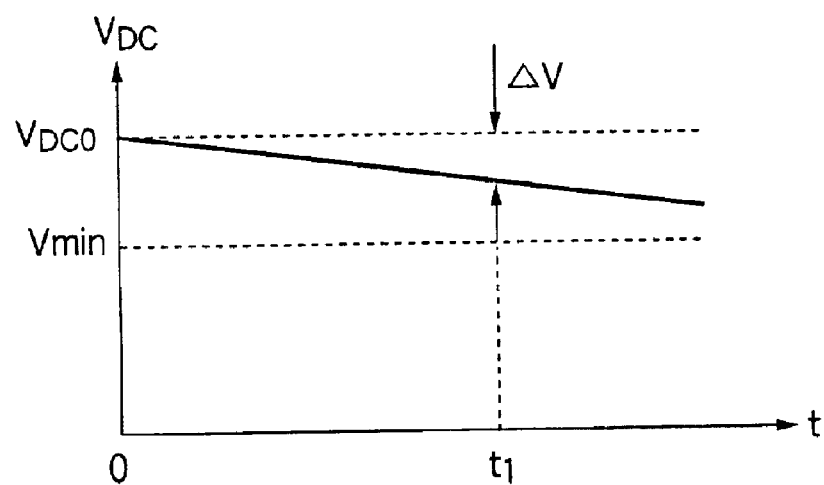
FIG. 19 is a view showing the output of a DC power source apparatus according to the eighth embodiment of the present invention.

In this connection, because the power source is taken in from the power line 1 which is the object on which the voltage compensation is conducted, when the voltage of the electric power system of the power line 1 is lowered and the compensation operation is conducted, the output voltage to be supplied to the voltage instantaneous dip control circuit 16 is lowered. Therefore, the discharging time constant from the capacitor 73 of the converter circuit 74 is increased so that the output voltage to normally operate the voltage instantaneous dip control circuit 16 is secured. When the instantaneous dip is generated in the system voltage, the output voltage $V_{DC}$ of the converter circuit 74 is, as shown in FIG. 19, lowered as the time elapses. For example, the output of the converter circuit 74 is lowered by $\Delta V$ in the compensation operation time t1 of the voltage fluctuation compensating apparatus 100. Herein, in the case where the DC voltage supply minimum voltage required for the voltage instantaneous dip control circuit 16 is Vmin, when $\Delta V$ is increased more than ($V_{DC}$-Vmin), the supply voltage to the voltage instantaneous dip control circuit 16 is reduced lower than Vmin in the compensation operation, and the voltage instantaneous dip control circuit 16 is not normally operated. Therefore, in the present embodiment, from the compensation operation time t1 of the voltage fluctuation compensating apparatus 100 and the DC voltage supply minimum voltage Vmin required for the voltage instantaneous dip control circuit 16, the allowable voltage dip amount $\Delta$Va is obtained, and the output voltage dip rate of the converter circuit 74 is made lower than $\Delta$Va/t1. For this, the capacity of the capacitor 73 may be increased so that the discharging time constant of the capacitor 73 of the output portion of the converter circuit 74 is more than a predetermined value.

In the present embodiment, the DC voltage necessary for the voltage instantaneous dip control circuit 16 can be supplied, even during the dip of the system voltage, and the operation abnormality of the voltage instantaneous dip control circuit 16 can be prevented, and the reliability of the voltage fluctuation compensating apparatus 100 is increased.

Figure 20:
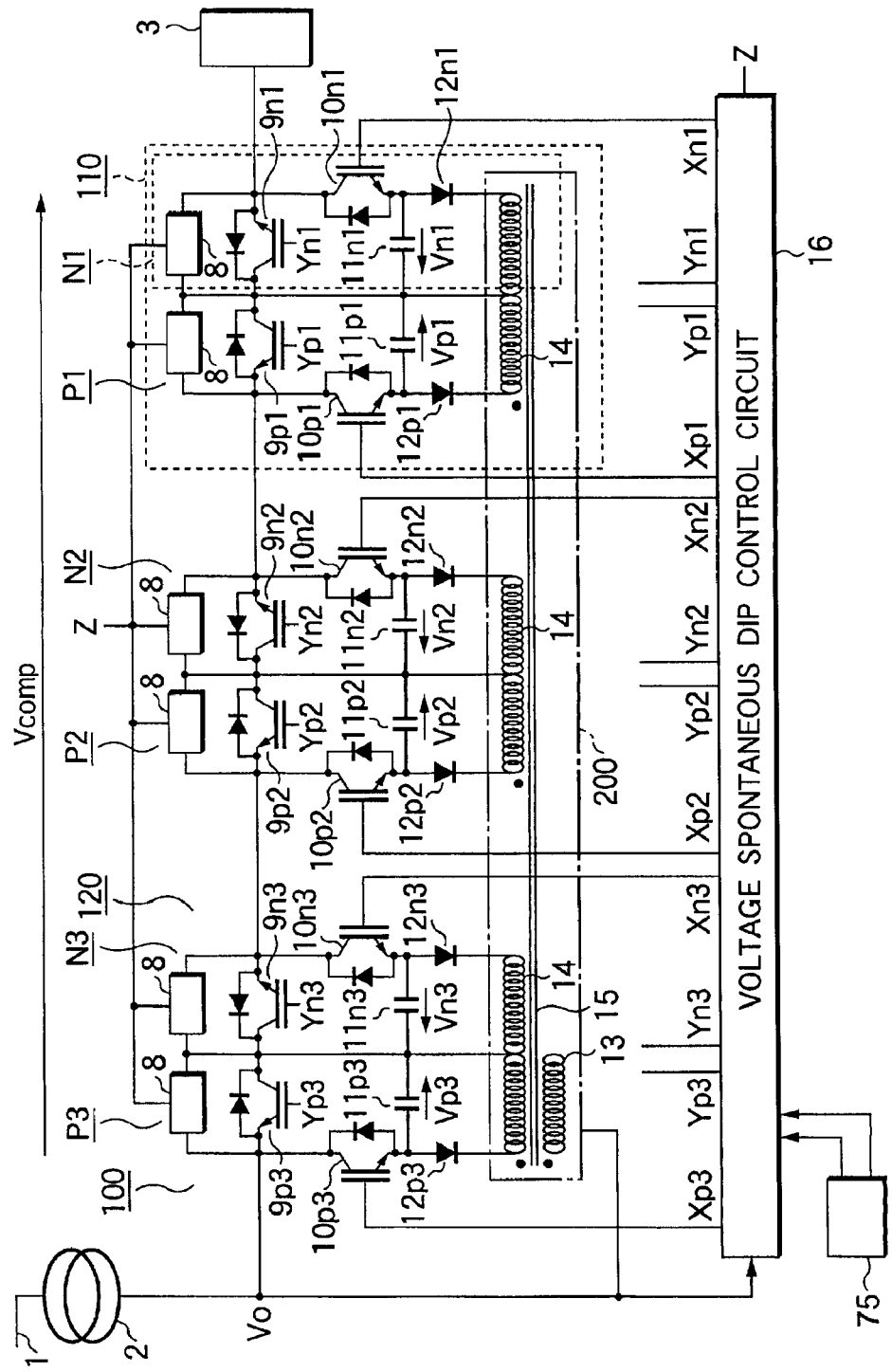
FIG. 20 is a structural view of the voltage variation compensation apparatus according to another example of the eighth embodiment of the present invention.

In this connection, in the above embodiment, the DC power source apparatus 70 in which the power source is taken in from the power line 1 which is the object on which the voltage compensation is conducted, is shown, however, as shown in FIG. 20, the DC power source 75 connected to another electric power system from the power line 1 which is the object on which the voltage compensation is conducted, may be used. In this case, because the DC voltage is supplied to the voltage instantaneous dip control circuit 16 from the DC power source 75 connected to another system from the electric power system on which the voltage fluctuation compensating apparatus 100 conducts the voltage compensation, even when the instantaneous dip is generated in the electric power system of the object of the compensation, the influence is not affected and the DC voltage can be stably supplied to the voltage instantaneous dip control circuit 16. For the DC power source 75, the battery, solar battery, or window power generation apparatus may also be used, and the same effect can be obtained.

Ninth Embodiment

Next, a ninth embodiment of the present invention will be described. Generally, the protective function is provided in the electric power system, and by the over current relay and under voltage relay, the abnormality of the system is detected, thereby, the electric path is separated by the protective relay. The protective relay is structured in such a manner that the over current relay or under voltage relay conducts the interruption operation only by any one abnormal signal. This is for the reason that, when the short circuit accident is generated in the electric power system, because the large current flows and the voltage dip due to the short circuit accident is generated, when two of the over current and voltage dip are monitored, even when anyone relay is troubled, the accident can be securely detected by the abnormal signal from the other relay.

In the ninth embodiment of the present invention, referring to FIG. 21, a case where, in the electric power system provided with the normal protective function as described above, the voltage fluctuation compensating apparatus shown in the above first embodiment is introduced, will be described below. As shown in the drawing, the electric power from the power line 1 is stepped-down by the transformer 2, and initially, passes a protection breaker 80, inputted into the voltage fluctuation compensating apparatus 100 in an electric path 81a, and the output of the voltage fluctuation compensating apparatus 100 is connected to each customer 3 by the electric path 81b, and the electric power is supplied. The protection breaker 80 separates the electric path 81a from the transformer 2 which is the voltage source at the system accident, and on the electric path 81a just under this protection breaker 80, an ammeter 83 for the over current rely 82 for the over current detection, and the volt meter 85 for the under voltage relay 84b for the under voltage detection, are arranged.

The over current relay 82 outputs a signal [1], when the current in the electric path 81a exceeds a predetermined value, and when it is under than the value, the over current relay 82 outputs a signal [0] and the output signal is the first input of an OR circuit 86. On the one hand, in the under voltage relay 84, when the voltage in the electric path 81a is under than a predetermined value, the signal [1] which is the voltage dip detection signal 87, is outputted, and when it is more than a predetermined value, the signal [0] is outputted, and the output signal is the first input of an AND circuit 88 provided in the output portion of the voltage fluctuation compensating apparatus 100. In the voltage fluctuation compensating apparatus 100, a NOT signal of a signal Z from the voltage instantaneous dip control circuit 16 shown, for example, in FIG. 2, is inputted into the AND circuit 88. That is, during the voltage compensation operation, the signal [0], and during the voltage compensation operation stop, the signal [1] are outputted, and the output signal is the second input of the AND circuit 88. The output of the AND circuit 88 is the second input of the OR circuit 86, and the output of the OR circuit 86 is inputted into the protection breaker 80 as the electric path interruption command 89. When the electric path interruption command 89 is [0], the protection breaker 80 is not operated, and when it is [1], the protection breaker 80 conducts the interruption operation.

Figure 21:
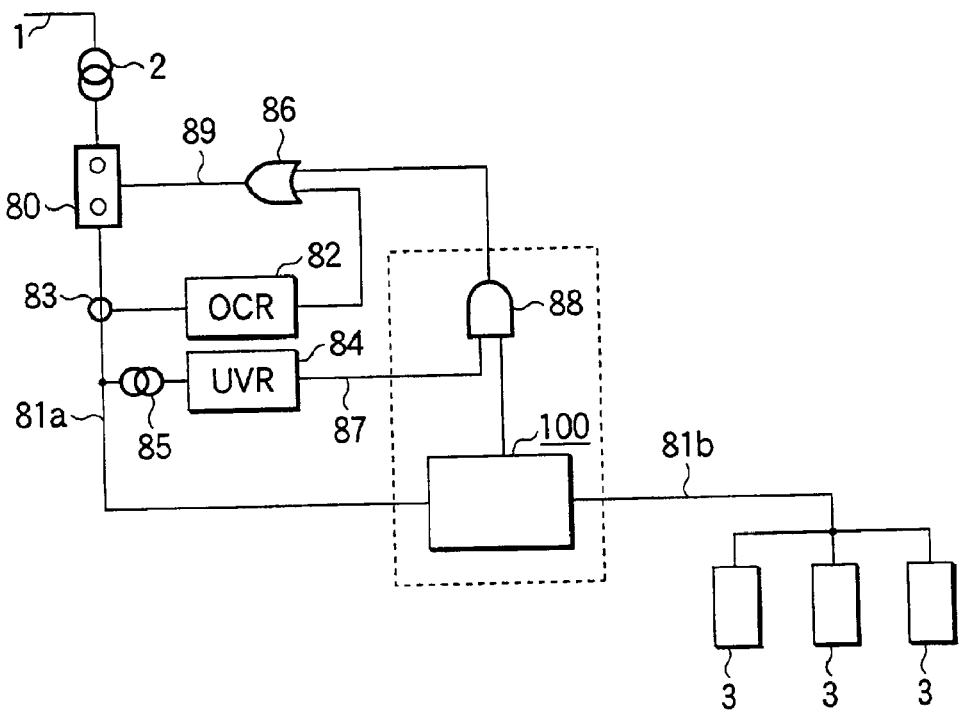
FIG. 21 is an outline structural view of the voltage variation compensation apparatus according to a ninth embodiment of the present invention.
Figure 22:
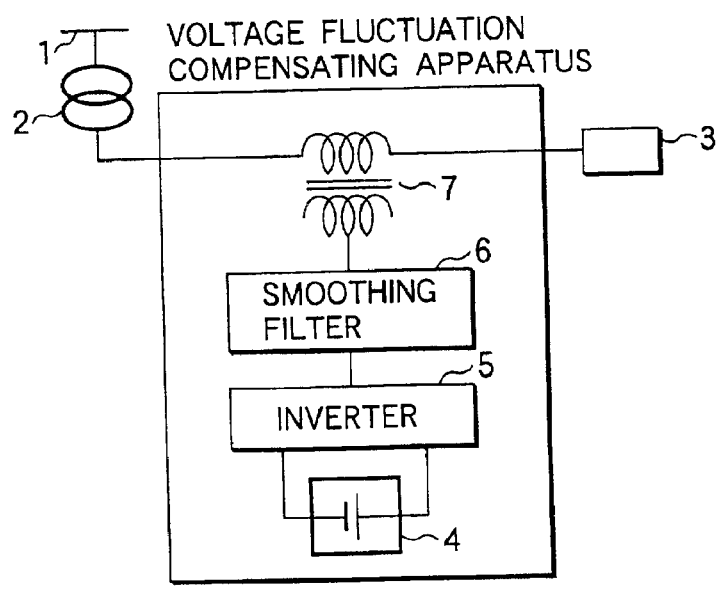
FIG. 22 is an outline structural view of the conventional voltage fluctuation compensating apparatus.
Figure 23:
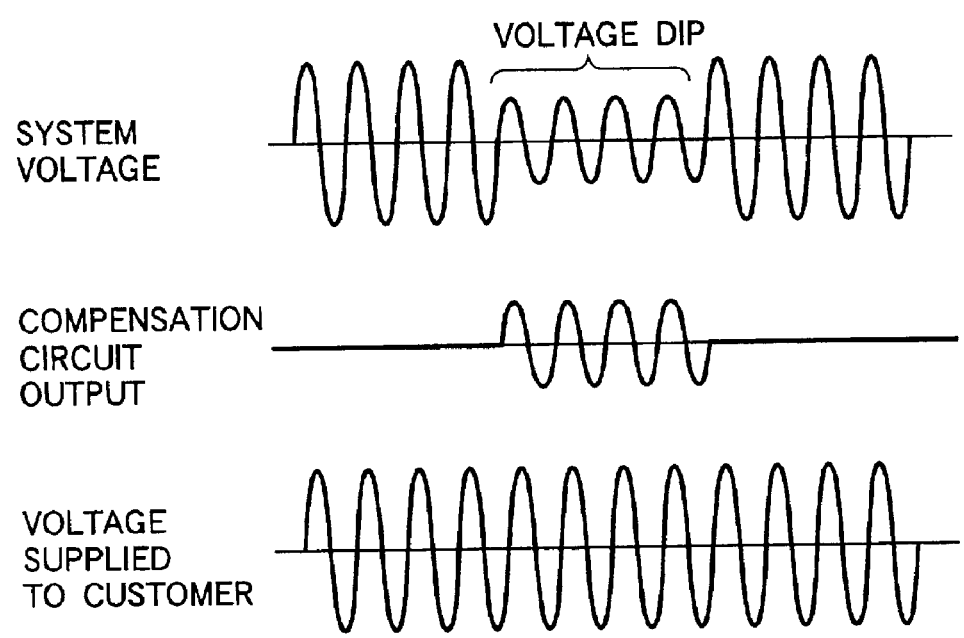
FIG. 23 is a view for explaining the voltage compensation operation of the conventional voltage fluctuation compensating apparatus.

In FIG. 21, when the system voltage of the power line 1 is normal, and there is no abnormality in the downstream system, both outputs of the over current relay 82 and the under voltage relay 84 are [0],and further, because the voltage compensation operation is stopped, the output of the voltage fluctuation compensating apparatus 100 is [1]. Into the AND circuit 88, [0], [1] are inputted, and the output is [0], accordingly, into the OR circuit 86, [0], [0] are inputted, and the output is [0], and the protection breaker 80 does not conduct the interruption operation.

When the system voltage is lowered by the accident of the power line 1, the voltage fluctuation compensating apparatus 100 instantaneously conducts the compensation operation, and outputs the signal [0] showing under-voltage compensation operation. On the one hand, the response of the under-voltage relay 84 is slow, and the voltage dip of the electric path 81a is detected, and the time at which the under-voltage relay 84 outputs the voltage dip detection signal 87, that is, the signal [1], is after the time at which the voltage fluctuation compensating apparatus 100 starts the operation. Further, the output of the over current relay 82 is [0]. Accordingly, [0], [1] are inputted into the AND circuit 88, and the output is [0], and the protection breaker 80 does not conduct the interruption operation. Thereby, the voltage fluctuation compensating apparatus 100 conducts the compensation operation of the insufficient voltage, and the electric power is supplied to the customer 3.

As described above, the AND circuit 88 is arranged in the output portion of the voltage fluctuation compensating apparatus 100, and during the voltage compensation operation, the voltage dip detection signal 87 outputted from the under-voltage relay 84 is made not to be transmitted to the protection breaker 80 of the electric power system, and to be blocked. That is, the voltage dip detection signal 87 from the under-voltage relay 84 which is the electric path interruption command 89 of the protection breaker 80, does not operated as the electric path interruption command 89 during the voltage compensation operation of the voltage fluctuation compensating apparatus 100, and the protection breaker 80 does not conduct the interruption operation. Therefore, the voltage fluctuation compensating apparatus 100 can conduct the voltage compensation operation with the high reliability, at the time of the instantaneous dip of the system voltage, and the compensated voltage can be supplied to the load customer 3.

In this connection, in the present embodiment, a case where the voltage fluctuation compensating apparatus 100 is arranged at the send out portion of the transmission system, is shown, however, a case where it is arranged in the customer 3 local area, is also the same. Further, in the present embodiment, although the structure in which the voltage dip detection signal 87 of the under-voltage relay 84 is not transmitted to the protection breaker 80 during the voltage compensation operation of the voltage fluctuation compensating apparatus 100, is adopted, the structure in which the under-voltage relay 84 does not operate during the voltage compensation operation, may also be allowable.

Further, in the above embodiment, although the voltage fluctuation compensating apparatus shown in the above first embodiment is used, it may also be applicable to any one of the voltage fluctuation compensating apparatus which is connected to the electric power system, and in which the compensation voltage is outputted by the electric power supply control according to the monitoring of the voltage dip of the electric power system.

In each of the first to eighth embodiments, the charging capacitors in the voltage compensating circuits respectively have the charging voltages of approximately $2^k$-fold (K=0, 1, 2, . . . ) with respect to the smallest charging voltage value (absolute value) of the charging voltages. However, the ratio of the charging voltages may be a combination of another voltage charging ratio. The system can be optimized because the combination of the charging voltage ratio of the relationship of the $2^k$-fold does not allow overlap of the charging voltages chargeable to the load.

In each embodiment, the capacitors are used as the energy storage units. However, for example, batteries may be used as the energy storage units in place of the capacitors.

As described above, in the voltage fluctuation compensating apparatus of the structure (1) according to the present invention, because a plurality of voltage compensation circuits in which the energy accumulator in which respectively different voltage are accumulated, is provided, and the DC voltage accumulated in the energy accumulator is converted into the AC voltage and outputted, are connected to the electric power system in series, and at the time of the voltage dip of the above electric power system, a desired combination is selected from the plurality of voltage compensation circuits, and by the total sum of its output voltage, the voltage dip of the above electric power system, is compensated, the apparatus structure in which the cost is low and the size reduction is promoted, can be attained, and the voltage compensation which is fine and highly accurate, can be conducted.

Further, a voltage fluctuation compensating apparatus of the structure (2) according to the present invention is structured in such manner that, in the structure (1), because the absolute value of the different voltage respectively accumulated in the energy accumulator in a plurality of the voltage compensation circuits is about $2^K$ times (K=0, 1, 2, . . . ) of the minimum output voltage (absolute value) of the voltage compensation circuit, the compensation voltage can be gradation-controlled at the same interval, and further, the voltage compensation can be accurately conducted.

Further, a voltage fluctuation compensating apparatus of the structure (3) according to the present invention is structured in such manner that, in the structure (1) or (2), because a high speed mechanical short circuit switch for by-passing the voltage compensation circuit is provided for each output terminal of one or serial connected plural voltage compensation circuits, and when the voltage of the electric power system is normal, all the short circuit switch are closed, and all the voltage compensation circuits are by-passed, and when the voltage of the electric power system is lowered, all the short circuit switch are opened, and by the voltage output from the voltage compensation circuits, the voltage dip of the electric power system is compensated, the loss at the normal time can be reduced, and the capacity of the cooling apparatus may be small, and the whole of the apparatus can be low cost, and can be down-sized.

Further, a voltage fluctuation compensating apparatus of the structure (4) according to the present invention is structured in such manner that, in the structure (1) or (2), because a high speed mechanical short circuit switch for by-passing the voltage compensation circuit is provided on the output terminals of the total compensation circuit composed of all the serially connected voltage compensation circuits, in parallel with the total compensation circuit, and when the voltage of the electric power system is normal, the short circuit switch is closed, and the total compensation circuit are by-passed, and when the voltage of the electric power system is lowered, the short circuit switch is opened, and by the voltage output from all the compensation circuits, the voltage dip of the electric power system is compensated, the loss of the normal time can be lowered, the capacity of the cooling apparatus can be small, and further, the number of short circuit switches can be one, thereby, the whole apparatus can be low cost, and down-sized.

Further, a voltage fluctuation compensating apparatus of the structure (5) according to the present invention is structured in such manner that, in the structure 4, because, when the short circuit switch is started to be opened due to the voltage dip of the electric power system, in the closed circuit structured by all the compensation circuits and the short circuit switch, by circulating the discharge current from a predetermined energy accumulator in the total compensation circuit, the current zero point is forcibly formed in the AC current of the commercial frequency circulating in the short circuit switch, and the AC current is instantly interrupted, by circulating the discharging current by using a portion of the total compensation circuit, the compensation operation of the voltage dip can be instantly started from the time at which the abnormality is generated in the voltage, and the high reliable voltage compensation can be conducted.

Further, a voltage fluctuation compensating apparatus of the structure (6) according to the present invention is structured in such manner that, in the structure 5, because the detection control section to conduct the monitoring of the voltage dip in the electric power system and the power supply control according to that, is provided with a means for detecting the current polarity circulating in the short circuit switch, and a desired voltage compensation circuit is selected, and a means for controlling so that, from the energy accumulator in the voltage compensation circuit, the discharge current whose polarity is reverse to the current circulating in the short circuit switch, is circulated, is provided, by the apparatus structure which is low cost and in which the down-sizing is promoted, the high reliable voltage compensation can be conducted.

Further, because a voltage fluctuation compensating apparatus of the structure (7) according to the present invention is provided with an energy accumulator, and the voltage compensation circuit to convert the DC voltage accumulated in the energy accumulator into the AC voltage and to output it, is connected to the electric power system in series, and the high speed mechanical short circuit switch is connected in parallel with the voltage compensation circuit, and when the voltage of the electric power system is normal, the short circuit switch is closed, and the voltage compensation circuit is by-passed, and when the voltage of the electric power system is lowered, the short circuit switch is opened, and by the voltage output from the voltage compensation circuit, the voltage dip of the electric power system is compensated, the loss of the normal time can be reduced, and by the apparatus structure which is low cost and in which the down-sizing is promoted, the voltage compensation can be conducted.

Further, a voltage fluctuation compensating apparatus of the structure (8) according to the present invention is structured in such manner that, in the structure 7, because, when the short circuit switch is started to be opened due to the voltage dip of the electric power system, in the closed circuit structured by the voltage compensation circuit and the short circuit switch, by circulating the discharge current from the energy accumulator in the voltage compensation circuit, the current zero point is forcibly formed in the AC current of the commercial frequency circulating in the short circuit switch, and the AC current is instantly interrupted, by circulating the discharging current by using a portion of the voltage compensation circuit, the compensation operation of the voltage dip can be instantly started from the time at which the abnormality is generated in the voltage, and the highly reliable voltage compensation can be conducted.

Further, a voltage fluctuation compensating apparatus of the structure (9) according to the present invention is structured in such manner that, in any one of the structures 3, 4 or 7, because the short circuit switch is provided with a high speed commutation means by which, at the start time of the open of the short circuit switch due to the voltage dip of the electric power system, the current circulating in the short circuit switch is instantly interrupted by supplying the current which is in the reverse direction to the current, the compensation operation of the voltage dip can be instantly started from the time at which the abnormality is generated in the voltage, and the highly reliable voltage compensation can be conducted.

Further, a voltage fluctuation compensating apparatus of the structure (10) according to the present invention is structured in such manner that, in any one of the structures 3–9, because the short circuit switch is a mechanical switch by which the electromagnetic repulsion force is used for the opening operation of the contact and it is opened, the loss at the conducting time is very small, and it is a short circuit switch having the structure appropriate for the instantaneous interruption, and the high reliable voltage compensation can be securely conducted.

Further, a voltage fluctuation compensating apparatus of the structure (11) according to the present invention is structured in such a manner that, in any one of the structures 1–4, because each voltage compensation circuit is provided with a compensation switch to connect the voltage accumulated in the energy accumulator to the electric power system, and a change-over switch connected in parallel with the output end of the voltage compensation circuit, and the compensation switch and the change-over switch are respectively structured by the semiconductor switching device in which the diode is connected in anti-parallel, the accurate voltage compensation can be securely conducted.

Further, a voltage fluctuation compensating apparatus of the structure (12) according to the present invention is structured in such a manner that, in any one of the structures 1–4, because each voltage compensation circuit is provided with a full bridge inverter composed of 4 semiconductor switching devices in which the diodes are respectively connected in anti-parallel, and the voltage accumulated in the energy accumulator is outputted corresponding to the polarity at the time of the voltage dip of the electric power system with any polarity of positive or negative, the good accurate voltage compensation can be securely conducted.

Further, a voltage fluctuation compensating apparatus of the structure (13) according to the present invention is structured in such a manner that, in any one of the structures 1–4, because each voltage compensation circuit is provided with a change-over switch in which 2 semiconductor switching devices in which the diodes are respectively connected in anti-parallel are serially connected in the reverse direction, and which is connected in parallel to the output end of the voltage compensation circuit, and a half bridge inverter composed of 2 semiconductor switching devices in which the diodes are respectively connected in anti-parallel, and the voltage accumulated in any one of one pair of energy accumulator from which the positive and negative voltage are outputted, is outputted corresponding to the polarity at the time of voltage dip of the electric power system, the good accurate voltage compensation can be securely conducted.

Further, a voltage fluctuation compensating apparatus of the structure (14) according to the present invention is structured in such a manner that, in any one of the structures 1–13, because the energy accumulator is a capacitor which is charged by the charging transformer and charging diode, the compensation voltage can be securely outputted.

Further, a voltage fluctuation compensating apparatus of the structure (15) according to the present invention is structured in such a manner that, in the structure 14, because the current limiting resistor is inserted in the charging close circuit composed of the charging transformer secondary winding, charging diode and capacitor, it can be prevented that the over current flows in the closed circuit for charging at the time of charging, thereby, the abnormal heat generation and breakage of the circuit parts can be prevented.

Further, a voltage fluctuation compensating apparatus of the structure (16) according to the present invention is structured in such a manner that, in the structure 11, because an energy accumulator is a capacitor to be charged by the charging transformer and charging diode, and the capacitors of a plurality of voltage compensation circuits are charged by the common secondary winding of the charging transformer, the apparatus structure is simplified.

Further, a voltage fluctuation compensating apparatus of the structure (17) according to the present invention is structured in such a manner that, in the structure 16, because the capacitor of all the voltage compensation circuits is respectively connected with a resistance corresponding to a desired charging voltage in parallel, and provided with a charging transformer secondary winding by which all the capacitors are collectively charged, and between the intermediate point between both terminals of the positive polarity and negative polarity and the positive polarity side terminal, all the capacitors whose output is the positive polarity are serially connected, and between the intermediate point and the negative polarity side terminal, all the capacitors whose output voltage is the negative polarity are serially connected, and the output from the intermediate point of the charging transformer secondary winding is connected to the connection point of the capacitor of the positive polarity and the capacitor of the negative polarity, and to each of the capacitors, the charging voltage whose voltage is divided corresponding to the ratio of the resistance connected in parallel is charged, the charging transformer secondary winding is very simplified, and by the apparatus structure which is low cost and in which the down-sizing is promoted, the good accurate voltage compensation can be securely conducted.

Further, a voltage fluctuation compensating apparatus of the structure (18) according to the present invention is structured in such a manner that, in the structure 17, because a current limiting resistance which is sufficiently smaller than the resistances connected in parallel to each of capacitors is inserted between the intermediate point of the charging transformer secondary winding and the connection point of the positive polarity capacitor and negative polarity capacitor, the leakage current due to the charging voltage can be good reliably limited, thereby, the breakage of the charging transformer can be prevented.

Further, a voltage fluctuation compensating apparatus of the structure (19) according to the present invention is structured in such a manner that, in any one of the structures 14–18, because the primary side of the charging transformer to charge the capacitor is connected to the electric power system, when the system voltage is normal, the capacitor can be automatically slowly charged, and the apparatus is a small size and can be simplified.

Further, a voltage fluctuation compensating apparatus of the structure (20) according to the present invention is structured in such a manner that, in any one of the structures 1–19, because, in order to operate the detection control section to conduct the monitoring of the voltage dip in the electric power system and the power supply control according to that, the DC power source apparatus is structured by a step down transformer whose primary side is connected to the electric power system, and a converter circuit which is connected to the secondary side of the step down transformer and is composed of the rectification circuit and capacitor, and the DC voltage from the converter circuit is supplied to the detection control section, the DC voltage can be supplied to the detection control section with the good controllability.

Further, a voltage fluctuation compensating apparatus of the structure (21) according to the present invention is structured in such a manner that, in the structure 20, because, during the operation time to compensate the voltage dip of the electric power system, the capacitor capacitance is increased so that the output voltage dip from the DC power source apparatus is lower than a predetermined allowance value, and the discharging time constant from the capacitor to the converter circuit output section is set to a value larger than a predetermined value, the detection control section can be stably operated, and the reliability of the voltage fluctuation compensating apparatus is increased.

Further, a voltage fluctuation compensating apparatus of the structure (22) according to the present invention is structured in such a manner that, in any one of the structures 1–19, because, in order to operate the detection control section to conduct the monitoring of the voltage dip in the electric power system and the power supply control according to that, the DC voltage is supplied from the DC power source structured by a separate system from the electric power system to the detection control section, the detection control section can be stably operated, and the reliability of the voltage fluctuation compensating apparatus is increased.

Further, a voltage fluctuation compensating apparatus of the structure (23) according to the present invention is structured in such a manner that, in the structures 1 or 2, because a by-pass switch is provided in parallel with the total compensation circuit on the output ends of the total compensation circuit composed of all the voltage compensation circuits which are connected in series, at the maintenance work or inspection, the electric power can be supplied to the load through the by-pass switch.

Further, a voltage fluctuation compensating apparatus of the structure (24) according to the present invention is structured in such a manner that, in the structures 4 or 23, because a cut off switch is inserted into the all the compensation circuit side from the connection point of the short circuit switch or the by-pass switch on both sides of the total compensation circuit, while the electric power is supplied to the load, the maintenance work or inspection can be safely conducted in the condition of no-voltage.

Further, a voltage fluctuation compensating apparatus of the structure (25) according to the present invention is structured in such a manner that, in the structure 4, because a cut off switch is connected in series on both ends of the circuit in which the total compensation circuit and short circuit switch are connected in parallel, and the outer sides of the cut off switches on both sides are made connection points, and a by-pass switch is provided in parallel with the total compensation circuit and the short circuit switch, while the electric power is supplied to the load through the by-pass switch at the time of the maintenance work or inspection, the maintenance work or inspection of the total compensation circuit and the short circuit switch can be safely conducted in the condition of no-voltage.

Further, a voltage fluctuation compensating apparatus of the structure (26) according to the present invention is structured in such a manner that, in any one of the structures 1–4, because, on the upstream side of the electric power system from the voltage fluctuation compensating apparatus connected to the electric power system, an electric power system protection breaker in which an under-voltage relay is provided and by which the voltage dip lower than a predetermined value is detected, and the electric path is interrupted, is arranged, and a circuit by which, during the operation to compensate the voltage dip of the electric power system by the voltage output from the voltage compensation circuit, the voltage dip detection signal which is the electric path interruption command outputted from the under-voltage relay is not transmitted to the electric power system protection breaker and the electric path is blocked, is provided, the voltage fluctuation compensating apparatus can conduct the voltage compensation operation with the good reliability, at the time of dip of the system voltage, and the compensated voltage can be supplied to the load.

Further, a voltage fluctuation compensating apparatus of the structure (27) according to the present invention is structured in such a manner that, because, on the upstream side of the electric power system from the voltage fluctuation compensating apparatus, the electric power system protection breaker in which the under-voltage relay is provided and by which the voltage dip more than a predetermined value of the electric power system is detected and the electric path is interrupted, is arranged, and a circuit by which, during the output of the compensation voltage, the detection signal of the voltage dip which is the electric path interruption command outputted from the under-voltage relay is not transmitted to the electric power system protection breaker and the electric path is blocked, is provided, the voltage fluctuation compensating apparatus can conduct the voltage compensation operation with the good reliability at the time of dip of the system voltage, and the compensated voltage can be supplied to the load.

What is claimed is:

1. A voltage fluctuation compensating apparatus for suppressing fluctuation of a voltage supplied to a load comprising:

a detection control section for detecting a voltage dip in an electric power system and controlling power feeding in accordance with detection of a voltage dip; and a plurality of the voltage compensation circuits connected in series to the electric power system, the voltage compensation circuits including a plurality of energy accumulators respectively having charging voltages different from one another, the voltage compensation circuits converting DC voltages of the energy accumulators into AC voltages and outputting the AC voltages, wherein, when a voltage dip occurs in the electric power system, a combination of the plurality of voltage compensation circuits is selected so the sum of output voltages from the combination of voltage compensation circuits compensates the voltage dip of the electric power system.

2. The voltage fluctuation compensating apparatus according to claim 1, wherein the different voltages respectively accumulated in the energy accumulators in the plurality of voltage compensation circuits have absolute values about $2^k$ (where K=0, 1, 2, ...) times the absolute value of a minimum of the voltages of the voltage compensation circuits.

3. The voltage fluctuation compensating apparatus according to claim 1, further comprising at least one of short circuit switches for by-passing the voltage compensation circuits, the short circuit switches being provided for each output terminal of at least one of the voltage compensation circuits, wherein all the short circuit switches are closed and all the voltage compensation circuits are by-passed when no voltage dip occurs in the voltage of the electric power system; and all the short circuit switches are opened and the voltages output from the voltage compensation circuits compensate the electric power system when the voltage of the electric power system dips.

4. The voltage fluctuation compensating apparatus according to claim 1, further comprising at least one short circuit switch for by-passing the voltage compensation circuit, the short circuit switch being connected in parallel with output terminals of a total compensation circuit, including all of the voltage compensation circuits connected in series, wherein, the short circuit switch is closed and all the voltage compensation circuits are by-passed when no voltage dip occurs in the electric power system; and the short circuit switch is opened and the voltage output from the total compensation circuit compensates the electric power system when the voltage of the electric power system dips.

5. The voltage fluctuation compensating apparatus according to claim 4, wherein, when the short circuit switch starts to open due to the voltage dip of the electric power system, a discharge current from one of the energy accumulators in the total compensation circuit is circulated in a closed circuit constituted by the total compensation circuit and the short circuit switch, and a current zero point is forcibly established in an AC current having a commercial frequency and circulating in the short circuit switch to interrupt the AC current instantly.

6. The voltage fluctuation compensating apparatus according to claim 5, wherein the detection control section includes a detector for detecting polarity of current circulating in the short circuit switch and including a controller for selecting a voltage compensation circuit from the voltage compensation circuits, and controlling so that the discharge current, having a polarity reverse to the current circulating in the short circuit switch is circulated from the energy accumulators in the voltage compensation circuit.

7. A voltage fluctuation compensating apparatus for suppressing fluctuation of a voltage supplied to a load comprising:

a detection control section for detecting a voltage dip in an electric power system and controlling power feeding in accordance with detection of a voltage dip;

a voltage compensation circuit including an energy accumulator having a charging voltage value, the voltage compensation circuit converting a DC voltage in the energy accumulator into an AC voltage and outputting the AC voltage, the voltage compensation circuit being connected in series to the electric power system; and a short circuit switch connected in parallel with the voltage compensation circuit, wherein the short circuit switch is closed and the voltage compensation circuit is by-passed when no voltage dip occurs in the voltage of the electric power system; and the short circuit switch is opened and the voltage output from the voltage compensation circuit compensates the electric power system when the voltage of the electric power system dips.

8. The voltage fluctuation compensating apparatus according to claim 7, wherein, when the short circuit switch starts to open due to the voltage dip of the electric power system, a discharge current from the energy accumulator in the voltage compensation circuit is circulated in a closed circuit constituted by the voltage compensation circuit and the short circuit switch, and a current zero point is forcibly established in an AC current having a commercial frequency and circulating in the short circuit switch to interrupt the AC current instantly.

9. The voltage fluctuation compensating apparatus according to claim 7, wherein the short circuit switch instantaneously interrupts the current circulating in the short circuit switch by supplying a current in a reverse direction to the current flowing when the short circuit switch is opened due to the voltage dip of the electric power system.

10. The voltage fluctuation compensating apparatus according to claim 7, wherein the short circuit switch is a mechanical switch opened by an electromagnetic repulsion force.

11. The voltage fluctuation compensating apparatus according to claim 1, wherein each of the voltage compensation circuits comprises:

a compensation switch for connecting the voltage accumulated in the energy accumulator to the electric power system; and a change-over switch connected in parallel with the output end of the voltage compensation circuit, wherein the compensation switch and the change-over switch are respective semiconductor switching devices in which diodes are connected in anti-parallel.

12. The voltage fluctuation compensating apparatus according to claim 1, wherein each of the voltage compensation circuits comprises a full wave inverter having four semiconductor switching devices in which diodes are respectively connected in anti-parallel and the energy accumulator outputs a voltage having a polarity corresponding to a polarity at the time of the voltage dip of the electric power system.

13. The voltage fluctuation compensating apparatus according to claim 1, wherein each of the voltage compensation circuits comprises:

a change-over switch including two first semiconductor switching devices and two first diodes respectively connected in anti-parallel with the first semiconductor switching devices, the first semiconductor switching devices being serially connected in the reverse direction and connected in parallel to an output end of the voltage compensation circuit; and a half-wave inverter including two second semiconductor switching devices and second diodes respectively connected in anti-parallel with the second semiconductor devices, wherein any pair of the energy accumulators outputs a positive and negative voltage, corresponding to polarity at the time of voltage dip of the electric power system.

14. The voltage fluctuation compensating apparatus according to claim 1, wherein each of the energy accumulators is a capacitor charged by a charging transformer and a charging diode.

15. The voltage fluctuation compensating apparatus according to claim 14, including a current limiting resistor inserted in a charging close circuit constituted by a secondary winding of the charging transformer, the charging diode, and the capacitor.

16. The voltage fluctuation compensating apparatus according to claim 11, wherein each of the energy accumulators includes a capacitor charged by a charging transformer and a charging diode, and the capacitors of the plurality of voltage compensation circuits are charged by a common secondary winding of the charging transformer.

17. The voltage fluctuation compensating apparatus according to claim 16, wherein the capacitor of the voltage compensation circuit is connected with a resistance, corresponding to a charging voltage, in parallel, and including a charging transformer secondary winding for charging all of the capacitors collectively, wherein, all of the capacitors having outputs have a positive polarity are serially connected between a positive electrode terminal and an intermediate point between terminals of the positive polarity and the negative-polarity of the charging transformer secondary winding;

all the capacitors having output voltages have a negative polarity are serially connected between the intermediate point and a negative polarity terminal;

the output from the intermediate point of the charging transformer secondary winding is connected to a connection node of the capacitor having the positive polarity and the capacitor having a negative polarity; and the charging voltage is divided in a ratio of the resistances connected in parallel to each of the capacitors.

18. The voltage fluctuation compensating apparatus according to claim 17, including a current limiting resistance smaller than the resistances connected in parallel to each of capacitors, inserted between the intermediate point of the charging transformer secondary winding and the connection point of the positive polarity capacitor and the negative polarity capacitor.

19. The voltage fluctuation compensating apparatus according to claim 14, wherein the primary side of the charging transformer for charging the capacitor is connected to the electric power-system.

20. The voltage fluctuation compensating apparatus according to claim 1, further comprising a DC power source apparatus for operating the detection control section, the DC power source apparatus including:

a step down transformer having a primary side connected to the electric power system; and a converter circuit connected to a secondary side of the step down transformer and including a rectification circuit and a capacitor, wherein a DC voltage from the converter circuit is supplied to the detection control section.

21. The voltage fluctuation compensating apparatus according to claim 20, wherein, when the voltage dip of the electric power system is compensated, the capacitor capacitance is increased and a discharging time constant from the capacitor to an output section of the converter circuit is set to be larger than a second value, so that a dip of the output voltage from the DC power source apparatus is lower than a first value.

22. The voltage fluctuation compensating apparatus according to claim 19, wherein the DC voltage is supplied from a DC power source, in a separate system, from the electric power system to the detection control section, in order to operate the detection control section to detect a voltage dip in the electric power system and control the power supply based on the detection.

23. The voltage fluctuation compensating apparatus according to claim 1, further comprising a by-pass switch connected in parallel with a total compensation circuit, on output terminals of the total compensation circuit constituted by all of the voltage compensation circuits connected in series.

24. The voltage fluctuation apparatus according to claim 4, further comprising a cut off switch inserted onto a side of the total compensation circuit from the connection point of the short circuit switch or the by-pass switch on both sides of the total compensation circuit.

25. The voltage fluctuation compensating apparatus according to claim 4, further comprising a cut off switch and a by-pass switch, wherein the cut off switch is connected in series at both ends of a circuit in which the total compensation circuit and the short circuit switch are connected in parallel;

outer sides of the cut off switches on both sides are connection points; and the by-pass switch is connected in parallel with the total compensation circuit and the short circuit switch.

26. The voltage fluctuation compensating apparatus according to claim 1, further comprising:

an electric power system protection breaker
provided on an upstream side of the electric power system from the voltage variation compensation apparatus connected to the electric power system, including an under-voltage relay, and
for detecting a voltage dip lower than a predetermined value and interrupting the electric path; and a circuit for not transmitting and blocking a voltage dip detection signal output from the under-voltage relay, to the electric power system protection breaker, during the voltage dip of the electric power system compensated by the voltage output from the voltage compensation circuit.

27. A voltage fluctuation compensating apparatus connected to an electric power system, the voltage fluctuation compensating apparatus detecting a voltage dip of the electric power system and controlling the electric power supply based on the detecting and outputting a compensation voltage to compensate the voltage dip of the electric power system and to suppress fluctuation of the voltage to be supplied to a load, the voltage fluctuation compensating apparatus comprising:

an electric power system protection breaker located on an upstream side of the electric power system from the voltage fluctuation compensating apparatus and having an under-voltage relay, the electric power system protection breaker detecting a voltage dip more than a predetermined value for interrupting an electric path; and a circuit for not transmitting and blocking a voltage dip detection signal output from the under-voltage relay, to the electric power system protection breaker, during the voltage dip of the electric power system compensated by the voltage output from the voltage compensation circuit.

* * * * *